(12) United States Patent
Hebert

(10) Patent No.: US 7,139,564 B2
(45) Date of Patent: Nov. 21, 2006

(54) WIRELESS COMMUNICATION DEVICE FOR FIELD PERSONNEL

(76) Inventor: Thomas H. Hebert, 1340 Eastwood Dr., Lutz, FL (US) 33549

( * ) Notice: Subject to any disclaimer, the term of this patent is extended or adjusted under 35 U.S.C. 154(b) by 579 days.

(21) Appl. No.: 09/924,959

(22) Filed: Aug. 8, 2001

(65) Prior Publication Data
US 2002/0055358 A1   May 9, 2002

Related U.S. Application Data

(60) Provisional application No. 60/223,646, filed on Aug. 8, 2000.

(51) Int. Cl.
  *G05B 15/02* (2006.01)
  *G05B 19/18* (2006.01)
  *G05B 11/01* (2006.01)
  *G01M 1/38* (2006.01)
  *H04Q 7/20* (2006.01)
(52) U.S. Cl. .................... 455/423; 700/17; 700/26; 700/83; 700/204; 700/300; 700/276; 455/67.1
(58) Field of Classification Search ............... 379/21, 379/1.01, 29.01, 106.01, 106.03, 106.04, 379/102.05; 455/423, 424, 425, 67.1; 700/9, 700/17–19, 65–66, 83, 204, 276–277, 300
See application file for complete search history.

(56) References Cited

U.S. PATENT DOCUMENTS

| | | | | |
|---|---|---|---|---|
| 4,916,909 A | * | 4/1990 | Mathur et al. ................ | 62/59 |
| 4,961,158 A | | 10/1990 | Sussman ................ | 364/709.04 |
| 5,005,197 A | * | 4/1991 | Parsons et al. ............... | 379/21 |
| 5,073,862 A | * | 12/1991 | Carlson ...................... | 702/185 |
| 5,189,606 A | * | 2/1993 | Burns et al. .................. | 705/10 |
| 5,481,481 A | * | 1/1996 | Frey et al. .................... | 702/82 |
| 5,533,093 A | * | 7/1996 | Horton et al. ................ | 379/21 |
| 5,664,207 A | | 9/1997 | Crumpler et al. ........... | 395/766 |

(Continued)

*Primary Examiner*—Binh K. Tieu
(74) *Attorney, Agent, or Firm*—Holland & Knight LLP

(57) ABSTRACT

First, a system for providing direct field technical, troubleshooting, engineering analysis, equipment performance and efficiency analysis, new equipment and parts information, invoicing and sales support by means of data input and data retrieval in the field through the use by field located personnel of a hand-held, wireless communication device that allows direct field communication with a base or service provider master computer and software programs. Finally, utilization of a base or service provider located mater computer and software programs to provide all the primary computing processes needed to support a limited field located data entry and retrieval device that could further use the input data to establish a master computer file for a customer, equipment, performance and invoicing database.

20 Claims, 22 Drawing Sheets

U.S. PATENT DOCUMENTS

| | | |
|---|---|---|
| 5,826,240 A | 10/1998 | Brockman et al. ............ 705/11 |
| 5,867,688 A | 2/1999 | Simmon et al. ............ 395/500 |
| 5,878,276 A | 3/1999 | Aebli et al. ................. 395/839 |
| 5,884,202 A | 3/1999 | Arjomand .................... 701/29 |
| 5,922,040 A | 7/1999 | Prabhakaran ............... 701/117 |
| 5,924,069 A | 7/1999 | Kowalkowski et al. ..... 704/275 |
| 5,963,911 A | 10/1999 | Walker et al. ................. 705/7 |
| 5,964,847 A | 10/1999 | Booth, III et al. .............. 710/1 |
| 6,008,810 A | 12/1999 | Bertram et al. ............. 345/347 |
| 6,067,030 A * | 5/2000 | Burnett et al. ......... 340/870.05 |
| 6,073,136 A | 6/2000 | Bertram et al. ............. 707/104 |
| 6,083,007 A | 7/2000 | Joliat et al. .................. 434/262 |
| 6,094,609 A | 7/2000 | Arjomand .................... 701/29 |
| 6,122,648 A | 9/2000 | Roderick .................... 707/513 |
| 6,125,356 A | 9/2000 | Brockman et al. ............ 705/37 |
| 6,385,510 B1 * | 5/2002 | Hoog et al. ................. 700/276 |
| 6,477,518 B1 * | 11/2002 | Li et al. ....................... 706/45 |
| 6,625,448 B1 * | 9/2003 | Stern .......................... 455/425 |
| 6,961,586 B1 * | 11/2005 | Barbosa et al. .......... 455/556.1 |
| 2003/0060933 A1 * | 3/2003 | Sulfstede ................... 700/276 |
| 2003/0195640 A1 * | 10/2003 | Krocker et al. ............... 700/26 |
| 2004/0192329 A1 * | 9/2004 | Barbosa et al. .......... 455/456.1 |

* cited by examiner

I. AVAILABLE INFORMATION DATA SHEET:

PART A

TYPE OF ANALYSIS (X which applies): Perf [ ] Trblshtg [ ] T & B [ ]

Job Name: [ ]

Job Address: [street] [city] [state] [zip] Phone: [ ] Fax: [ ]

Other: (e-mail) [ ] other [ ]

Date: [ ] Start Time: [ ]
Refrigerant Type: [ ] Air-cooled (X) [ ] Water-cooled (X) [ ] Refrig [ ]
Unit Number or Specific Location: [ ]
Type of System (X): Chiller [ ] Package [ ] Split [ ] A/C [ ] H/P [ ]

PART B

Package System
Chiller/Condenser
Fan Coil Unit :
Split System Condenser A/C
Split System Condenser H/P
Split System Air Handler
Refrigeration Unit Condenser
Refrigeration Unit Evaporator

DATA PLATE INFORMATION

| manuf | quantity | model no | serial no | fan speed | | | |
|---|---|---|---|---|---|---|---|
| | | | | | | | |

| | mfg | model no | serial no | hp | rpm | FLA/RLA | LRA | volts | phase | hz |
|---|---|---|---|---|---|---|---|---|---|---|
| Condenser Fan Motor | | | | | | | | | | |
| Blower Fan Motor | | | | | | | | | | |
| Compressor No 1 | | | | | | | | | | |
| Compressor No 2 | | | | | | | | | | |
| Compressor No 3 | | | | | | | | | | |
| Compressor No 4 | | | | | | | | | | |

Main Supply Plenum Dimensions [ ] Return Plenum Dim [ ]
Previous Month Electrical Consumption (KW) [ ] Total Cost ($) [ ]
Previous Month System Water Consumption (Gals) [ ] Total Cost ($) [ ]
Previous Month Gas Consumption (Cu Ft) [ ] Total Cost ($) [ ]

FIG. 4a

Miscellaneous Data Sheet

| Condition of: | Good | Bad | Explanation |
|---|---|---|---|
| Condenser Coil | | | |
| Evaportor Coil | | | |
| Cabinetry AH | | | |
| Cabinetry Cond | | | |
| Ductwork | | | |
| Liquid Line Dryer | | | |
| Suction Line Dryer | | | |
| Suction Accumulator | | | |
| Liquid Receiver | | | |
| Reversing Valve | | | |
| Expansion Device | | | |
| Refrigerant Lines | | | |
| Condenser Fan Motor | | | |
| Condenser Fan Blade | | | |
| Evaporator Blower Motor | | | |
| Evaporator Blower Shaft | | | |
| Evaporator Blower Bearings | | | |
| Evaporator Blower Belts | | | |
| Electrical Wiring | | | |
| Capacitors | | | |
| Contactors | | | |
| Relays | | | |
| Transformers | | | |
| Other Component (input below) | | | |
| | | | |
| | | | |
| | | | |
| | | | |

(X which applies)

Obvious Oil Leak Locations

| | | |
|---|---|---|
| | | |
| | | |
| | | |
| | | |

FIG. 4b

III. OPERATIONAL DATA SHEET:

| Temperatures, Refrigerant (X which applies) | Fahrenheit | Celsius |
|---|---|---|
| Hot Gas Discharge at Compressor | | |
| Hot Gas Entering Condenser | | |
| Mid Condenser Coil | | |
| Liquid out of condenser | | |
| Liquid into expansion device | | |
| Mid Evaporator coil | | |
| Suction line after evaporator | | |
| Suction line into compressor | | |
| Heat Pump, Suction line into rev Valve | | |
| Heat Pump, Hot Gas line into rev Valve | | |

| Temperatures, Air (X which applies) | | Fahrenheit | Celsius |
|---|---|---|---|
| Air Entering Condenser | DB | | |
| Air Entering Condenser | WB | | |
| Air Exiting Condenser | DB | | |
| Air Entering Evaporator | DB | | |
| Air Entering Evaporator | WB | | |
| Air Exiting Evaporator | DB | | |
| Air Exiting Evaporator | WB | | |
| Air Exiting Air Handler | DB | | |
| Air Exiting Air Handler | WB | | |

| Pressures, Refrigerant (X which applies) | PSIG | PSIA |
|---|---|---|
| Hot Gas Discharge @ compressor | | |
| Hot Gas Discharge @ condenser | | |
| Liquid Refrigerant exit condenser | | |
| Liquid Refrigerant enter Exp Device | | |
| Suction Gas exiting evaporator | | |
| Suction Gas entering compressor | | |

Pressures, Air Flow (in inches water gauge)
Static before Air Handler
Static after Air Handler
Velocity pressure Transverse Avg at
straight duct section with dimensions
given for main supply or return plenums

| Electrical Data (Running) | Amps | | | Volts | Phase | hz |
|---|---|---|---|---|---|---|
| | L1 | L2 | L3 | | | |
| Compressor No 1 | | | | | | |
| Compressor No 2 | | | | | | |
| Compressor No 3 | | | | | | |
| Compressor No 4 | | | | | | |
| Condenser Fan Motors | | | | | | |
| Quantity | | | | | | |
| Blower Motors | | | | | | |
| Quantity | | | | | | |
| Pumps - Chiller Circ  1 | | | | | | |
| 2 | | | | | | |
| Evaporative Tower  1 | | | | | | |
| 2 | | | | | | |
| Water Cooled Circ  1 | | | | | | |
| 2 | | | | | | |

| Temperatures, Water (X which applies) | | Fahrenheit | Celsius |
|---|---|---|---|
| Chiller | EWT | | |
| | LCWT | | |
| Water Cooled Condenser | EWT | | |
| | LWT | | |

| Water Flow Rate (X which applies) | PSIG | PSIA |
|---|---|---|
| Chiller, Evaporator Return Line | | |
| Chiller, Evaporator Supply Line | | |
| Water Cooled Equip Condenser Return Line | | |
| Condenser Supply Line | | |

FIG. 4C

IV. TROUBLE SHOOTING QUESTIONNAIRE DATA SHEET
*Mark all those that apply (X)*

Chiller Condenser
- Air Cooled
- Water Cooled
- Geothermal
- Dual Source

*Symptom (examples - list to be added to)*
- Unit will not run
- Outdoor unit section will not run
- Compressor will not start
- Outdoor fan motor will not start
- Outdoor unit condenser water pump will not start
- Compressor hums but will not start
- Compressor cycling on overload
- Compressor off on high pressure control
- Noisy compressor
- Compressor loses oil
- No cooling, but compressor runs continuously
- Liquid Refrigerant flooding compressor (cap tube system)
- Liquid Refrigerant flooding compressor (fixed orifice)
- Liquid Refrigerant flooding compressor (TXV)
- High head pressure
- Low head pressure
- High Suction Pressure
- Low suction pressure
- High operating costs
- Other

Water Tower
*Symptom (examples - list to be added to)*
- Fan motor will not run
- Cooling return water temperature high
- Scale buildup is rapid
- Sump water hardness is high
- Other

Fan Coil Unit
*Symptom (examples - list to be added to)*
- Fan motor will not run
- No cooling, but fan is on
- Too much cooling
- Other

FIG. 4d

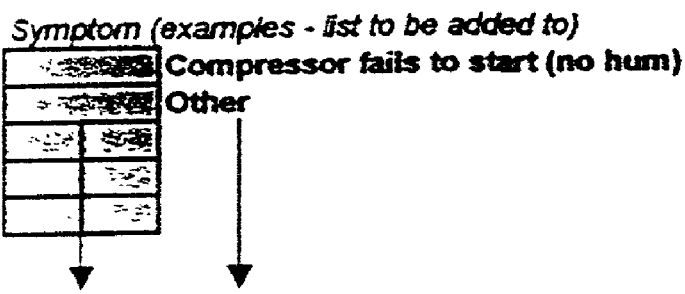
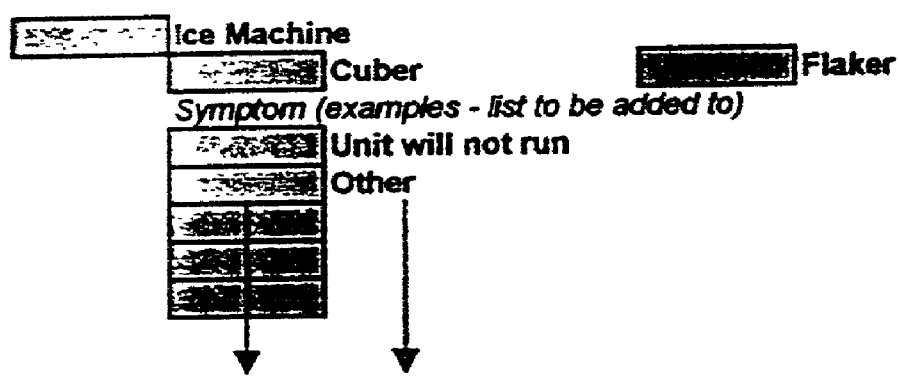
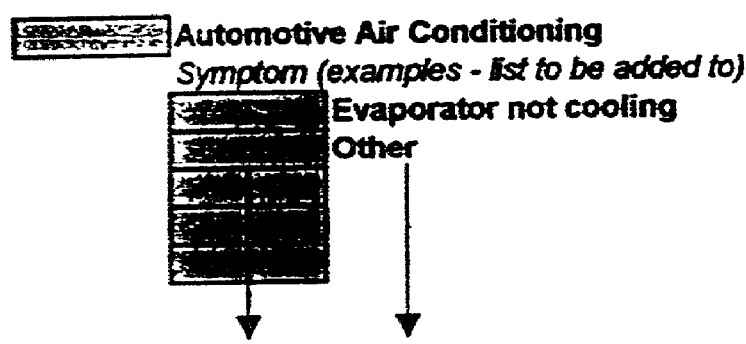
FIG. 4g

V. TEST AND BALANCE – AIR VOLUME DATA SHEET

A. *Mark all those that apply (X)*
- Constant volume system
- VAV System
- Other B. *Fill in all appropriate (highlighted) below:*
  *Example:*
- Design Air Flow VAV #1
- Other

FIG. 4h

I. AVAILABLE INFORMATION DATA SHEET:

PART A

TYPE OF ANALYSIS (X which applies):    Perf [X]    Trblshtg [ ]    T & B [ ]

Job Name: XYZ Homeowner    Phone: (200) 555-0000    Fax: (200) 555-0000

Job Address: *street* 3333 Anywhere St.    *city* Anytime    *state* Fla.    *zip* 32655

Other: *(e-mail)* www.homeowner.com    other

Date: 7/6/01    Start Time: 1:40 pm

Refrigerant Type: R-22    Air-cooled [X]    Water-cooled (X) [ ]

Unit Number or Specific Location: Only System at Residence

Type of System (X): Chiller [ ]    Package [ ]    Split [X]    A/C [ ]    H/P [X]    Refrig [ ]

PART B

| | manuf | quantity | model no | serial no | fan speed |
|---|---|---|---|---|---|
| Package System | | | | | |
| Chiller/Condenser | | | | | |
| Fan Coil Unit: | | | | | |
| Split System Condenser A/C | | | | | |
| Split System Condenser H/P | | | | | |
| Split System Air Handler | | | | | |
| Refrigeration Unit Condenser | | | | | |
| Refrigeration Unit Evaporator | | | | | |

| DATA PLATE INFORMATION | mfg | model no | serial no | hp | rpm | FLA/RLA | LRA | volts | phase | hz |
|---|---|---|---|---|---|---|---|---|---|---|
| Condenser Fan Motor | | | | | | | | | | |
| Blower Fan Motor | | | | | | | | | | |
| Compressor No 1 | | | | | | | | | | |
| Compressor No 2 | | | | | | | | | | |
| Compressor No 3 | | | | | | | | | | |
| Compressor No 4 | | | | | | | | | | |

Main Supply Plenum Dimensions    Return Plenum Dim

Previous Month Electrical Consumption (KW):    Total Cost ($):

Previous Month System Water Consumption (Gals)    Total Cost ($)

Previous Month Gas Consumption (Cu Ft)    Total Cost ($)

FIG. 5A

III. OPERATIONAL DATA SHEET:

| Temperatures, Refrigerant (X which applies) | Fahrenheit | Celsius |
|---|---|---|
| Hot Gas Discharge at Compressor | | |
| Hot Gas Entering Condenser | | |
| Mid Condenser Coil | | |
| Liquid out of condenser | | |
| Liquid into expansion device | | |
| Mid Evaporator coil | | |
| Suction line after evaporator | | |
| Suction line into compressor | | |
| Heat Pump, Suction line into rev Valve | | |
| Heat Pump, Hot Gas line into rev Valve | | |

| Temperatures, Air (X which applies) | | Fahrenheit | Celsius |
|---|---|---|---|
| Air Entering Condenser | DB | | |
| Air Entering Condenser | WB | | |
| Air Exiting Condenser | DB | | |
| Air Entering Evaporator | DB | | |
| Air Entering Evaporator | WB | | |
| Air Exiting Evaporator | DB | | |
| Air Exiting Evaporator | WB | | |
| Air Exiting Air Handler | DB | | |
| Air Exiting Air Handler | WB | | |

| Pressures, Refrigerant (X which applies) | PSIG | PSIA |
|---|---|---|
| Hot Gas Discharge @ compressor | | |
| Hot Gas Discharge @ condenser | | |
| Liquid Refrigerant exit condenser | | |
| Liquid Refrigerant enter Exp Device | | |
| Suction Gas exiting evaporator | | |
| Suction Gas entering compressor | | |

Pressures, Air Flow (In inches water gauge)
Static pressure ...
Static ...
Velocity pressure ...
straight duct section with ...
given for main supply or return plenums

| Electrical Data (Running) | Amps | | | Volts | Phase | hz |
|---|---|---|---|---|---|---|
| | L1 | L2 | L3 | | | |
| Compressor No 1 | | | | | | |
| Compressor No 2 | | | | | | |
| Compressor No 3 | | | | | | |
| Compressor No 4 | | | | | | |
| Condenser Fan Motors Quantity | | | | | | |
| Blower Motors Quantity | | | | | | |
| Pumps - Chiller Circ 1 | | | | | | |
| 2 | | | | | | |
| Evaporative Tower 1 | | | | | | |
| 2 | | | | | | |
| Water Cooled Circ 1 | | | | | | |
| 2 | | | | | | |

| Temperatures, Water (X which applies) | | Fahrenheit | Celsius |
|---|---|---|---|
| Chiller | EWT | | |
| | LCWT | | |
| Water Cooled Condenser | EWT | | |
| | LWT | | |

| Water Flow Rate (X which applies) | | PSIG | PSIA |
|---|---|---|---|
| Chiller, Evaporator | Return Line | | |
| Chiller, Evaporator | Supply Line | | |
| Water Cooled Equip Condenser | Return Line | | |
| Condenser | Supply Line | | |

III. OPERATIONAL DATA SHEET:

| Temperatures, Refrigerant (X which applies) | Fahrenheit | Celsius |
|---|---|---|
| | X | |
| Hot Gas Discharge at Compressor | 200 | |
| Hot Gas Entering Condenser | | |
| Mid Condenser Coil | | |
| Liquid out of condenser | 124 | |
| Liquid into expansion device | 124 | |
| Mid Evaporator coil | | |
| Suction line after evaporator | | |
| Suction line into compressor | 75 | |
| Heat Pump, Suction line into rev Valve | | |
| Heat Pump, Hot Gas line into rev Valve | | |

| Temperatures, Air (X which applies) | | Fahrenheit | Celsius |
|---|---|---|---|
| | | X | |
| Air Entering Condenser | DB | 92 | |
| Air Entering Condenser | WB | | |
| Air Exiting Condenser | DB | | |
| Air Entering Evaporator | DB | 75.0 | |
| Air Entering Evaporator | WB | 65.0 | |
| Air Exiting Evaporator | DB | N.A. | |
| Air Exiting Evaporator | WB | N.A. | |
| Air Exiting Air Handler | DB | 59.0 | |
| Air Exiting Air Handler | WB | 58.4 | |

| Pressures, Refrigerant (X which applies) | PSIG | PSIA |
|---|---|---|
| | X | |
| Hot Gas Discharge @ compressor | N.A. | |
| Hot Gas Discharge @ condenser | | |
| Liquid Refrigerant exit condenser | 275 | |
| Liquid Refrigerant enter Exp Device | N.A. | |
| Suction Gas exiting evaporator | | |
| Suction Gas entering compressor | 58 | |

| Pressures, Air Flow (in inches water gauge) | |
|---|---|
| Static before Air Handler | -.15 |
| Static after Air Handler | +.25 |
| Velocity pressure Transverse Avg. at straight duct section with dimensions given for main supply or return plenums | .033 |

| Electrical Data (Running) | Amps | | | Volts | Phase | hz |
|---|---|---|---|---|---|---|
| | L1 | L2 | L3 | | | |
| Compressor No 1 | 22.2 | 22.0 | — | 232 | 1 | 60 |
| Compressor No 2 | | | | | | |
| Compressor No 3 | | | | | | |
| Compressor No 4 | | | | | | |
| Condenser Fan Motors | 1.6 | 1.7 | — | 232 | 1 | 60 |
| Quantity 1 | | | | | | |
| Blower Motors | 3.5 | 3.6 | — | 232 | 1 | 60 |
| Quantity 1 | | | | | | |
| Pumps - Chiller Circ 1 | | | | | | |
| 2 | | | | | | |
| Evaporative Tower 1 | | | | | | |
| 2 | | | | | | |
| Water Cooled Circ 1 | | | | | | |
| 2 | | | | | | |

| Temperatures, Water (X which applies) | | Fahrenheit | Celsius |
|---|---|---|---|
| Chiller | EWT | | |
| | LCWT | | |
| Water Cooled Condenser | EWT | | |
| | LWT | | |

| Water Flow Rate (X which applies) | | PSIG | PSIA |
|---|---|---|---|
| Chiller, Evaporator | Return Line | | |
| Chiller, Evaporator | Supply Line | | |
| Water Cooled Equip Condenser | Return Line | | |
| Condenser | Supply Line | | |

FIG. 6b

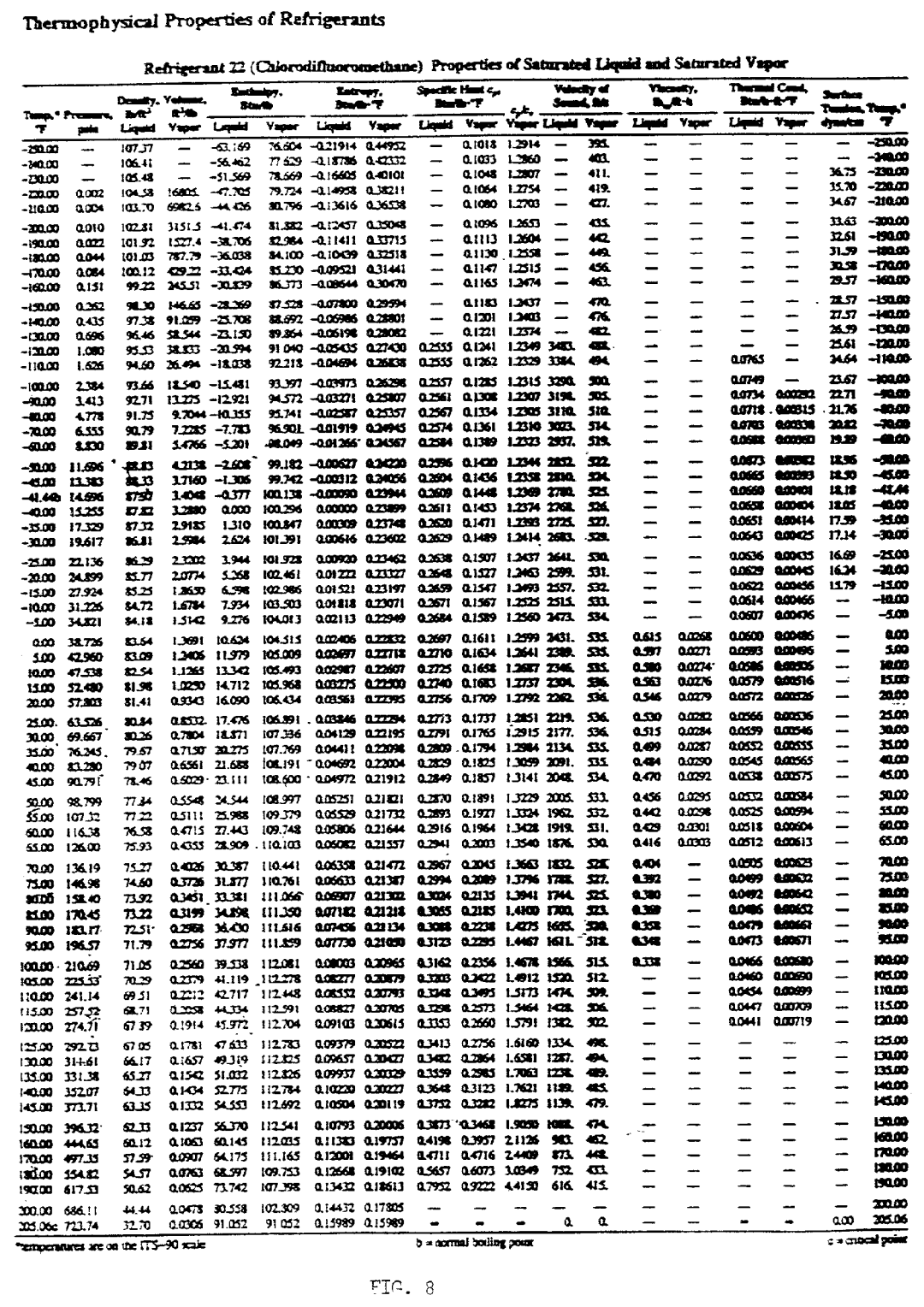

Thermophysical Properties of Refrigerants

Refrigerant 22 (Chlorodifluoromethane) Properties of Saturated Liquid and Saturated Vapor

| Temp.,* °F | Pressure, psia | Density, lb/ft³ Liquid | Volume, ft³/lb Vapor | Enthalpy, Btu/lb Liquid | Enthalpy, Btu/lb Vapor | Entropy, Btu/lb·°F Liquid | Entropy, Btu/lb·°F Vapor | Specific Heat $c_p$, Btu/lb·°F Liquid | Specific Heat $c_p$, Btu/lb·°F Vapor | $c_p/c_v$ Vapor | Velocity of Sound, ft/s Liquid | Velocity of Sound, ft/s Vapor | Viscosity, $lb_m$/ft·h Liquid | Viscosity, $lb_m$/ft·h Vapor | Thermal Cond., Btu/h·ft·°F Liquid | Thermal Cond., Btu/h·ft·°F Vapor | Surface Tension, dyne/cm | Temp.,* °F |
|---|---|---|---|---|---|---|---|---|---|---|---|---|---|---|---|---|---|---|
| -250.00 | — | 107.37 | — | -63.169 | 76.604 | -0.21914 | 0.44952 | — | 0.1018 | 1.2914 | — | 395. | — | — | — | — | — | -250.00 |
| -240.00 | — | 106.41 | — | -56.462 | 77.629 | -0.18786 | 0.42332 | — | 0.1033 | 1.2860 | — | 403. | — | — | — | — | — | -240.00 |
| -230.00 | — | 105.48 | — | -51.569 | 78.669 | -0.16605 | 0.40101 | — | 0.1048 | 1.2807 | — | 411. | — | — | — | — | 36.75 | -230.00 |
| -220.00 | 0.002 | 104.58 | 16805. | -47.705 | 79.724 | -0.14958 | 0.38211 | — | 0.1064 | 1.2754 | — | 419. | — | — | — | — | 35.70 | -220.00 |
| -210.00 | 0.004 | 103.70 | 6982.5 | -44.426 | 80.796 | -0.13616 | 0.36538 | — | 0.1080 | 1.2703 | — | 427. | — | — | — | — | 34.67 | -210.00 |
| -200.00 | 0.010 | 102.81 | 3151.5 | -41.474 | 81.882 | -0.12457 | 0.35048 | — | 0.1096 | 1.2653 | — | 435. | — | — | — | — | 33.63 | -200.00 |
| -190.00 | 0.022 | 101.92 | 1527.4 | -38.706 | 82.984 | -0.11411 | 0.33715 | — | 0.1113 | 1.2604 | — | 442. | — | — | — | — | 32.61 | -190.00 |
| -180.00 | 0.044 | 101.03 | 787.79 | -36.038 | 84.100 | -0.10439 | 0.32518 | — | 0.1130 | 1.2558 | — | 449. | — | — | — | — | 31.59 | -180.00 |
| -170.00 | 0.084 | 100.12 | 429.22 | -33.424 | 85.230 | -0.09521 | 0.31441 | — | 0.1147 | 1.2515 | — | 456. | — | — | — | — | 30.58 | -170.00 |
| -160.00 | 0.151 | 99.22 | 245.51 | -30.839 | 86.373 | -0.08644 | 0.30470 | — | 0.1165 | 1.2474 | — | 463. | — | — | — | — | 29.57 | -160.00 |
| -150.00 | 0.262 | 98.30 | 146.65 | -28.269 | 87.528 | -0.07800 | 0.29594 | — | 0.1183 | 1.2437 | — | 470. | — | — | — | — | 28.57 | -150.00 |
| -140.00 | 0.435 | 97.38 | 91.059 | -25.708 | 88.692 | -0.06986 | 0.28801 | — | 0.1201 | 1.2403 | — | 476. | — | — | — | — | 27.57 | -140.00 |
| -130.00 | 0.696 | 96.46 | 58.544 | -23.150 | 89.864 | -0.06198 | 0.28082 | — | 0.1221 | 1.2374 | — | 482. | — | — | — | — | 26.59 | -130.00 |
| -120.00 | 1.080 | 95.53 | 38.833 | -20.594 | 91.040 | -0.05435 | 0.27430 | 0.2555 | 0.1241 | 1.2349 | 3483. | 488. | — | — | — | — | 25.61 | -120.00 |
| -110.00 | 1.626 | 94.60 | 26.494 | -18.038 | 92.218 | -0.04694 | 0.26838 | 0.2555 | 0.1262 | 1.2329 | 3384. | 494. | — | — | 0.0765 | — | 24.64 | -110.00 |
| -100.00 | 2.384 | 93.66 | 18.540 | -15.481 | 93.397 | -0.03973 | 0.26298 | 0.2557 | 0.1285 | 1.2315 | 3290. | 500. | — | — | 0.0749 | — | 23.67 | -100.00 |
| -90.00 | 3.413 | 92.71 | 13.275 | -12.921 | 94.572 | -0.03271 | 0.25807 | 0.2561 | 0.1308 | 1.2307 | 3198. | 505. | — | — | 0.0734 | 0.00292 | 22.71 | -90.00 |
| -80.00 | 4.778 | 91.75 | 9.7044 | -10.355 | 95.741 | -0.02587 | 0.25357 | 0.2567 | 0.1334 | 1.2305 | 3110. | 510. | — | — | 0.0718 | 0.00315 | 21.76 | -80.00 |
| -70.00 | 6.555 | 90.79 | 7.2285 | -7.783 | 96.901 | -0.01919 | 0.24945 | 0.2574 | 0.1361 | 1.2310 | 3023. | 514. | — | — | 0.0703 | 0.00338 | 20.82 | -70.00 |
| -60.00 | 8.830 | 89.81 | 5.4766 | -5.201 | 98.049 | -0.01266 | 0.24567 | 0.2584 | 0.1389 | 1.2323 | 2937. | 519. | — | — | 0.0688 | 0.00360 | 19.89 | -60.00 |
| -50.00 | 11.696 | 88.83 | 4.2138 | -2.608 | 99.182 | -0.00627 | 0.24220 | 0.2596 | 0.1420 | 1.2344 | 2852. | 522. | — | — | 0.0673 | 0.00382 | 18.96 | -50.00 |
| -45.00 | 13.383 | 88.33 | 3.7160 | -1.306 | 99.742 | -0.00312 | 0.24056 | 0.2604 | 0.1436 | 1.2358 | 2810. | 524. | — | — | 0.0665 | 0.00393 | 18.50 | -45.00 |
| -41.44b | 14.696 | 87.90 | 3.4048 | -0.377 | 100.138 | -0.00090 | 0.23944 | 0.2609 | 0.1448 | 1.2369 | 2780. | 525. | — | — | 0.0660 | 0.00401 | 18.18 | -41.44 |
| -40.00 | 15.255 | 87.82 | 3.2880 | 0.000 | 100.296 | 0.00000 | 0.23899 | 0.2611 | 0.1453 | 1.2374 | 2768. | 526. | — | — | 0.0658 | 0.00404 | 18.05 | -40.00 |
| -35.00 | 17.329 | 87.32 | 2.9185 | 1.310 | 100.847 | 0.00309 | 0.23748 | 0.2620 | 0.1471 | 1.2393 | 2725. | 527. | — | — | 0.0651 | 0.00414 | 17.59 | -35.00 |
| -30.00 | 19.617 | 86.81 | 2.5984 | 2.624 | 101.391 | 0.00616 | 0.23602 | 0.2629 | 0.1489 | 1.2414 | 2683. | 528. | — | — | 0.0643 | 0.00425 | 17.14 | -30.00 |
| -25.00 | 22.136 | 86.29 | 2.3202 | 3.944 | 101.928 | 0.00920 | 0.23462 | 0.2638 | 0.1507 | 1.2437 | 2641. | 530. | — | — | 0.0636 | 0.00435 | 16.69 | -25.00 |
| -20.00 | 24.899 | 85.77 | 2.0774 | 5.268 | 102.461 | 0.01222 | 0.23327 | 0.2648 | 0.1527 | 1.2463 | 2599. | 531. | — | — | 0.0629 | 0.00445 | 16.24 | -20.00 |
| -15.00 | 27.924 | 85.25 | 1.8650 | 6.598 | 102.986 | 0.01521 | 0.23197 | 0.2659 | 0.1547 | 1.2493 | 2557. | 532. | — | — | 0.0622 | 0.00456 | 15.79 | -15.00 |
| -10.00 | 31.226 | 84.72 | 1.6784 | 7.934 | 103.503 | 0.01818 | 0.23071 | 0.2671 | 0.1567 | 1.2525 | 2515. | 533. | — | — | 0.0614 | 0.00466 | — | -10.00 |
| -5.00 | 34.821 | 84.18 | 1.5142 | 9.276 | 104.013 | 0.02113 | 0.22949 | 0.2684 | 0.1589 | 1.2560 | 2473. | 534. | — | — | 0.0607 | 0.00476 | — | -5.00 |
| 0.00 | 38.726 | 83.64 | 1.3691 | 10.624 | 104.515 | 0.02406 | 0.22832 | 0.2697 | 0.1611 | 1.2599 | 2431. | 535. | 0.615 | 0.0268 | 0.0600 | 0.00486 | — | 0.00 |
| 5.00 | 42.960 | 83.09 | 1.2406 | 11.979 | 105.009 | 0.02697 | 0.22718 | 0.2710 | 0.1634 | 1.2641 | 2389. | 535. | 0.597 | 0.0271 | 0.0593 | 0.00496 | — | 5.00 |
| 10.00 | 47.538 | 82.54 | 1.1265 | 13.342 | 105.493 | 0.02987 | 0.22607 | 0.2725 | 0.1658 | 1.2687 | 2346. | 535. | 0.580 | 0.0274 | 0.0586 | 0.00506 | — | 10.00 |
| 15.00 | 52.480 | 81.98 | 1.0250 | 14.712 | 105.968 | 0.03275 | 0.22500 | 0.2740 | 0.1683 | 1.2737 | 2304. | 536. | 0.563 | 0.0276 | 0.0579 | 0.00516 | — | 15.00 |
| 20.00 | 57.803 | 81.41 | 0.9343 | 16.090 | 106.434 | 0.03561 | 0.22395 | 0.2756 | 0.1709 | 1.2792 | 2262. | 536. | 0.546 | 0.0279 | 0.0572 | 0.00526 | — | 20.00 |
| 25.00 | 63.526 | 80.84 | 0.8532 | 17.476 | 106.891 | 0.03846 | 0.22294 | 0.2773 | 0.1737 | 1.2851 | 2219. | 536. | 0.530 | 0.0282 | 0.0566 | 0.00536 | — | 25.00 |
| 30.00 | 69.667 | 80.26 | 0.7804 | 18.871 | 107.336 | 0.04129 | 0.22195 | 0.2791 | 0.1765 | 1.2915 | 2177. | 536. | 0.515 | 0.0284 | 0.0559 | 0.00546 | — | 30.00 |
| 35.00 | 76.245 | 79.67 | 0.7150 | 20.275 | 107.769 | 0.04411 | 0.22098 | 0.2809 | 0.1794 | 1.2984 | 2134. | 535. | 0.499 | 0.0287 | 0.0552 | 0.00555 | — | 35.00 |
| 40.00 | 83.280 | 79.07 | 0.6561 | 21.688 | 108.191 | 0.04692 | 0.22004 | 0.2829 | 0.1825 | 1.3059 | 2091. | 535. | 0.484 | 0.0290 | 0.0545 | 0.00565 | — | 40.00 |
| 45.00 | 90.791 | 78.46 | 0.6029 | 23.111 | 108.600 | 0.04972 | 0.21912 | 0.2849 | 0.1857 | 1.3141 | 2048. | 534. | 0.470 | 0.0292 | 0.0538 | 0.00575 | — | 45.00 |
| 50.00 | 98.799 | 77.84 | 0.5548 | 24.544 | 108.997 | 0.05251 | 0.21821 | 0.2870 | 0.1891 | 1.3229 | 2005. | 533. | 0.456 | 0.0295 | 0.0532 | 0.00584 | — | 50.00 |
| 55.00 | 107.32 | 77.22 | 0.5111 | 25.988 | 109.379 | 0.05529 | 0.21732 | 0.2893 | 0.1927 | 1.3324 | 1962. | 532. | 0.442 | 0.0298 | 0.0525 | 0.00594 | — | 55.00 |
| 60.00 | 116.38 | 76.58 | 0.4715 | 27.443 | 109.748 | 0.05806 | 0.21644 | 0.2916 | 0.1964 | 1.3428 | 1919. | 531. | 0.429 | 0.0301 | 0.0518 | 0.00604 | — | 60.00 |
| 65.00 | 126.00 | 75.93 | 0.4355 | 28.909 | 110.103 | 0.06082 | 0.21557 | 0.2941 | 0.2003 | 1.3540 | 1876. | 530. | 0.416 | 0.0303 | 0.0512 | 0.00613 | — | 65.00 |
| 70.00 | 136.19 | 75.27 | 0.4026 | 30.387 | 110.441 | 0.06358 | 0.21472 | 0.2967 | 0.2045 | 1.3663 | 1832. | 528. | 0.404 | — | 0.0505 | 0.00623 | — | 70.00 |
| 75.00 | 146.98 | 74.60 | 0.3726 | 31.877 | 110.761 | 0.06633 | 0.21387 | 0.2994 | 0.2089 | 1.3796 | 1788. | 527. | 0.392 | — | 0.0499 | 0.00632 | — | 75.00 |
| 80.00 | 158.40 | 73.92 | 0.3451 | 33.381 | 111.066 | 0.06907 | 0.21302 | 0.3024 | 0.2135 | 1.3941 | 1744. | 525. | 0.380 | — | 0.0492 | 0.00642 | — | 80.00 |
| 85.00 | 170.45 | 73.22 | 0.3199 | 34.898 | 111.350 | 0.07182 | 0.21218 | 0.3055 | 0.2185 | 1.4100 | 1700. | 523. | 0.369 | — | 0.0486 | 0.00652 | — | 85.00 |
| 90.00 | 183.17 | 72.51 | 0.2968 | 36.430 | 111.616 | 0.07456 | 0.21134 | 0.3088 | 0.2238 | 1.4275 | 1655. | 520. | 0.358 | — | 0.0479 | 0.00661 | — | 90.00 |
| 95.00 | 196.57 | 71.79 | 0.2756 | 37.977 | 111.859 | 0.07730 | 0.21050 | 0.3123 | 0.2295 | 1.4467 | 1611. | 518. | 0.348 | — | 0.0473 | 0.00671 | — | 95.00 |
| 100.00 | 210.69 | 71.05 | 0.2560 | 39.538 | 112.081 | 0.08003 | 0.20965 | 0.3162 | 0.2356 | 1.4678 | 1566. | 515. | 0.338 | — | 0.0466 | 0.00680 | — | 100.00 |
| 105.00 | 225.53 | 70.29 | 0.2379 | 41.119 | 112.278 | 0.08277 | 0.20879 | 0.3203 | 0.2422 | 1.4912 | 1520. | 512. | — | — | 0.0460 | 0.00690 | — | 105.00 |
| 110.00 | 241.14 | 69.51 | 0.2212 | 42.717 | 112.448 | 0.08552 | 0.20793 | 0.3248 | 0.2495 | 1.5173 | 1474. | 509. | — | — | 0.0454 | 0.00699 | — | 110.00 |
| 115.00 | 257.52 | 68.71 | 0.2058 | 44.334 | 112.591 | 0.08827 | 0.20705 | 0.3298 | 0.2573 | 1.5464 | 1428. | 506. | — | — | 0.0447 | 0.00709 | — | 115.00 |
| 120.00 | 274.71 | 67.39 | 0.1914 | 45.972 | 112.704 | 0.09103 | 0.20615 | 0.3353 | 0.2660 | 1.5791 | 1382. | 502. | — | — | 0.0441 | 0.00719 | — | 120.00 |
| 125.00 | 292.73 | 67.05 | 0.1781 | 47.633 | 112.783 | 0.09379 | 0.20522 | 0.3413 | 0.2756 | 1.6160 | 1334. | 498. | — | — | — | — | — | 125.00 |
| 130.00 | 311.61 | 66.17 | 0.1657 | 49.319 | 112.825 | 0.09657 | 0.20427 | 0.3482 | 0.2864 | 1.6581 | 1287. | 494. | — | — | — | — | — | 130.00 |
| 135.00 | 331.38 | 65.27 | 0.1542 | 51.032 | 112.826 | 0.09937 | 0.20329 | 0.3559 | 0.2985 | 1.7063 | 1238. | 489. | — | — | — | — | — | 135.00 |
| 140.00 | 352.07 | 64.33 | 0.1434 | 52.775 | 112.784 | 0.10220 | 0.20227 | 0.3648 | 0.3123 | 1.7621 | 1189. | 485. | — | — | — | — | — | 140.00 |
| 145.00 | 373.71 | 63.35 | 0.1332 | 54.553 | 112.692 | 0.10504 | 0.20119 | 0.3752 | 0.3282 | 1.8275 | 1139. | 479. | — | — | — | — | — | 145.00 |
| 150.00 | 396.32 | 62.33 | 0.1237 | 56.370 | 112.541 | 0.10793 | 0.20006 | 0.3873 | 0.3468 | 1.9050 | 1088. | 474. | — | — | — | — | — | 150.00 |
| 160.00 | 444.65 | 60.12 | 0.1063 | 60.145 | 112.035 | 0.11383 | 0.19757 | 0.4198 | 0.3957 | 2.1126 | 983. | 462. | — | — | — | — | — | 160.00 |
| 170.00 | 497.35 | 57.59 | 0.0907 | 64.175 | 111.165 | 0.12001 | 0.19464 | 0.4711 | 0.4716 | 2.4409 | 873. | 448. | — | — | — | — | — | 170.00 |
| 180.00 | 554.82 | 54.57 | 0.0763 | 68.597 | 109.753 | 0.12668 | 0.19102 | 0.5657 | 0.6073 | 3.0349 | 752. | 433. | — | — | — | — | — | 180.00 |
| 190.00 | 617.53 | 50.62 | 0.0625 | 73.742 | 107.398 | 0.13432 | 0.18613 | 0.7952 | 0.9222 | 4.4150 | 616. | 415. | — | — | — | — | — | 190.00 |
| 200.00 | 686.11 | 44.44 | 0.0478 | 80.558 | 102.309 | 0.14432 | 0.17805 | — | — | — | — | — | — | — | — | — | — | 200.00 |
| 205.06c | 723.74 | 32.70 | 0.0306 | 91.052 | 91.052 | 0.15989 | 0.15989 | - | - | - | 0. | 0. | — | — | - | - | 0.00 | 205.06 |

*temperatures are on the ITS-90 scale b = normal boiling point c = critical point

FIG. 8

Superheated Vapor — Constant Pressure Tables at Pressure Intervals — R-22

V = volume in cu/ft/lb; H = enthalpy in Btu/lb; S = entropy in Btu/(lb)(°R) (saturation properties in parentheses)

| | Absolute Pressure (psi in.) | | | | | | | | | | | | | | |
|---|---|---|---|---|---|---|---|---|---|---|---|---|---|---|---|
| | 75 | | | 80 | | | 85 | | | 90 | | | 95 | | |
| | 60.304 PSIG (34.13 F) | | | 65.304 PSIG (37.76 F) | | | 70.304 PSIG (41.22 F) | | | 75.304 PSIG (44.53 F) | | | 80.304 PSIG (47.71 F) | | |
| Temp °F | V | H | S | V | H | S | V | H | S | V | H | S | V | H | S |
| | (0.72740) | (107.644) | (0.22098) | (0.68319) | (107.954) | (0.22029) | (0.64398) | (108.249) | (0.21964) | (0.60897) | (108.516) | (0.21903) | (0.57751) | (108.772) | (0.21845) |
| 40 | 0.74013 | 108.862 | 0.22303 | 0.68782 | 109.347 | 0.22107 | — | — | — | — | — | — | — | — | — |
| 50 | 0.76146 | 110.393 | 0.22645 | 0.70822 | 110.088 | 0.22454 | 0.66115 | 109.799 | 0.22272 | 0.61924 | 109.496 | 0.22086 | 0.58165 | 109.187 | 0.21906 |
| 60 | 0.78241 | 112.119 | 0.22981 | 0.72820 | 111.843 | 0.22793 | 0.68030 | 111.564 | 0.22614 | 0.63768 | 111.260 | 0.22443 | 0.59844 | 110.982 | 0.22277 |
| 70 | 0.80296 | 113.843 | 0.23308 | 0.74780 | 113.584 | 0.23125 | 0.69908 | 113.322 | 0.22948 | 0.65568 | 113.056 | 0.22781 | 0.61681 | 112.787 | 0.22616 |
| 80 | 0.82323 | 115.568 | 0.23632 | 0.76708 | 115.323 | 0.23450 | 0.71748 | 115.076 | 0.23278 | 0.67334 | 114.827 | 0.23112 | 0.63361 | 114.576 | 0.22952 |
| 90 | 0.84320 | 117.291 | 0.23946 | 0.78605 | 117.061 | 0.23770 | 0.73559 | 116.829 | 0.23598 | 0.69068 | 116.594 | 0.23437 | 0.65040 | 116.357 | 0.23277 |
| 100 | 0.86291 | 119.019 | 0.24266 | 0.80477 | 118.801 | 0.24083 | 0.75343 | 118.582 | 0.23915 | 0.70777 | 118.360 | 0.23755 | 0.66687 | 118.137 | 0.23602 |
| 110 | 0.88239 | 120.749 | 0.24556 | 0.82325 | 120.544 | 0.24392 | 0.77104 | 120.336 | 0.24226 | 0.72459 | 120.127 | 0.24068 | 0.68301 | 119.915 | 0.23917 |
| 120 | 0.90167 | 122.485 | 0.24868 | 0.84152 | 122.290 | 0.24696 | 0.78842 | 122.093 | 0.24532 | 0.74120 | 121.894 | 0.24376 | 0.69892 | 121.694 | 0.24226 |
| 130 | 0.92076 | 124.226 | 0.25168 | 0.85960 | 124.040 | 0.24995 | 0.80561 | 123.853 | 0.24833 | 0.75760 | 123.665 | 0.24678 | 0.71462 | 123.475 | 0.24531 |
| 140 | 0.93968 | 125.973 | 0.25460 | 0.87751 | 125.796 | 0.25290 | 0.82263 | 125.618 | 0.25130 | 0.77383 | 125.439 | 0.24977 | 0.73015 | 125.258 | 0.24831 |
| 150 | 0.95844 | 127.725 | 0.25759 | 0.89526 | 127.558 | 0.25582 | 0.83948 | 127.389 | 0.25422 | 0.78989 | 127.218 | 0.25271 | 0.74550 | 127.047 | 0.25126 |
| 160 | 0.97707 | 129.487 | 0.26035 | 0.91286 | 129.326 | 0.25869 | 0.85619 | 129.165 | 0.25711 | 0.80581 | 129.002 | 0.25561 | 0.76071 | 128.839 | 0.25418 |
| 170 | 0.99557 | 131.256 | 0.26319 | 0.93034 | 131.102 | 0.26154 | 0.87277 | 130.948 | 0.25997 | 0.82159 | 130.793 | 0.25848 | 0.77578 | 130.637 | 0.25706 |
| 180 | 1.0139 | 133.032 | 0.26599 | 0.94770 | 132.885 | 0.26435 | 0.88923 | 132.738 | 0.26279 | 0.83725 | 132.589 | 0.26131 | 0.79073 | 132.440 | 0.25990 |
| 190 | 1.0322 | 134.817 | 0.26876 | 0.96495 | 134.677 | 0.26712 | 0.90556 | 134.535 | 0.26558 | 0.85279 | 134.393 | 0.26411 | 0.80556 | 134.251 | 0.26271 |
| 200 | 1.0504 | 136.611 | 0.27150 | 0.98209 | 136.476 | 0.26987 | 0.92182 | 136.341 | 0.26833 | 0.86824 | 136.205 | 0.26687 | 0.82029 | 136.069 | 0.26548 |
| 210 | 1.0685 | 138.414 | 0.27421 | 0.99915 | 138.284 | 0.27259 | 0.93797 | 138.154 | 0.27106 | 0.88359 | 138.024 | 0.26961 | 0.83492 | 137.893 | 0.26823 |
| 220 | 1.0865 | 140.226 | 0.27690 | 1.0161 | 140.101 | 0.27528 | 0.95404 | 139.977 | 0.27376 | 0.89885 | 139.851 | 0.27232 | 0.84946 | 139.725 | 0.27094 |
| 230 | 1.1044 | 142.047 | 0.27956 | 1.0330 | 141.926 | 0.27795 | 0.97003 | 141.808 | 0.27644 | 0.92403 | 141.687 | 0.27500 | 0.86393 | 141.566 | 0.27363 |

FIG. 9.

PERFORMANCE TABLE  BRISTOL COMPRESSORS
MODEL H25A56QCBC 60Hz

REFRIGERANT : R22
DISPLACEMENT : 5.46 CUBIC INCHES
MOTOR : 2-POLE
VOLTAGE : 230-1-60
SUBCOOLING : 15.0 deg F
SUPERHEAT : 20.0 deg F Release EN: A29905
Revision EN: B15908  Date: 7/94
Preliminary Data

CAPACITY (BTU/HR)
EVAPORATING TEMPERATURE, deg F

| CONDENSING TEMPERATURE deg F | -20 | -15 | -10 | -5 | 0 | 5 | 10 | 15 | 20 | 25 | 30 | 35 | 40 | 45 | 50 | 55 |
|---|---|---|---|---|---|---|---|---|---|---|---|---|---|---|---|---|
| 80 | 12512 | 15425 | 18645 | 22184 | 26057 | 30279 | 34864 | 39825 | 45178 | 50956 | 57113 | 63724 | 70782 | 78303 | | |
| 90 | 11331 | 14025 | 17018 | 20325 | 23960 | 27957 | 32271 | 36975 | 42064 | 47552 | 53453 | 59782 | 66553 | 73779 | 81176 | 89051 |
| 100 | 10079 | 12554 | 15322 | 18398 | 21796 | 25530 | 29614 | 34063 | 38890 | 44110 | 49737 | 55785 | 62269 | 69203 | 76600 | 84475 |
| 110 | | 11057 | 13602 | 16449 | 19611 | 23103 | 26939 | 31134 | 35700 | 40654 | 46008 | 51777 | 57976 | 64618 | 71717 | 79288 |
| 120 | | | | 14520 | 17448 | 20700 | 24290 | 28231 | 32539 | 37227 | 42310 | 47802 | 53717 | 60068 | 66872 | 74141 |
| 130 | | | | | | 18365 | 21710 | 25400 | 29450 | 33875 | 38688 | 43903 | 49534 | 55599 | 62108 | 69076 |
| 140 | | | | | | | | 22684 | 26478 | 30641 | 35185 | 40126 | 45478 | 51254 | 57469 | 64138 |
| 150 | | | | | | | | | | | 31846 | 36514 | 41586 | 47077 | 53000 | 59571 |

POWER (WATTS)
EVAPORATING TEMPERATURE, deg F

| CONDENSING TEMPERATURE deg F | -20 | -15 | -10 | -5 | 0 | 5 | 10 | 15 | 20 | 25 | 30 | 35 | 40 | 45 | 50 | 55 |
|---|---|---|---|---|---|---|---|---|---|---|---|---|---|---|---|---|
| 80 | 2163 | 2319 | 2465 | 2599 | 2721 | 2830 | 2925 | 3005 | 3071 | 3121 | 3155 | 3172 | 3173 | 3153 | | |
| 90 | 2231 | 2404 | 2566 | 2719 | 2860 | 2990 | 3108 | 3213 | 3304 | 3382 | 3444 | 3492 | 3523 | 3538 | | |
| 100 | 2271 | 2459 | 2640 | 2812 | 2974 | 3127 | 3268 | 3399 | 3518 | 3624 | 3716 | 3795 | 3860 | 3909 | 3943 | 3963 |
| 110 | | 2487 | 2687 | 2879 | 3064 | 3240 | 3407 | 3565 | 3712 | 3847 | 3972 | 4083 | 4182 | 4268 | 4339 | 4395 |
| 120 | | | | 2922 | 3130 | 3331 | 3525 | 3710 | 3887 | 4054 | 4210 | 4356 | 4491 | 4613 | 4723 | 4819 |
| 130 | | | | | | 3400 | 3621 | 3836 | 4043 | 4242 | 4433 | 4614 | 4785 | 4946 | 5096 | 5234 |
| 140 | | | | | | | | 3943 | 4182 | 4414 | 4640 | 4858 | 5067 | 5267 | 5458 | 5639 |
| 150 | | | | | | | | | | | 4852 | 5087 | 5336 | 5577 | 5810 | 6035 |

CURRENT (AMPS)
EVAPORATING TEMPERATURE, deg F

| CONDENSING TEMPERATURE deg F | -20 | -15 | -10 | -5 | 0 | 5 | 10 | 15 | 20 | 25 | 30 | 35 | 40 | 45 | 50 | 55 |
|---|---|---|---|---|---|---|---|---|---|---|---|---|---|---|---|---|
| 80 | 9.9 | 10.6 | 11.3 | 11.8 | 12.3 | 12.8 | 13.1 | 13.4 | 13.7 | 13.9 | 14.1 | 14.2 | 14.2 | 14.3 | | |
| 90 | 10.1 | 10.9 | 11.6 | 12.3 | 12.8 | 13.4 | 13.9 | 14.3 | 14.6 | 15.0 | 15.2 | 15.5 | 15.7 | 15.9 | | |
| 100 | 10.1 | 11.0 | 11.9 | 12.6 | 13.3 | 13.9 | 14.5 | 15.1 | 15.5 | 16.0 | 16.4 | 16.8 | 17.1 | 17.4 | 17.7 | 18.0 |
| 110 | | 11.1 | 12.0 | 12.9 | 13.7 | 14.4 | 15.1 | 15.8 | 16.4 | 17.0 | 17.5 | 18.0 | 18.5 | 19.0 | 19.4 | 19.8 |
| 120 | | | | 13.1 | 14.0 | 14.8 | 15.7 | 16.4 | 17.2 | 17.9 | 18.6 | 19.2 | 19.8 | 20.5 | 21.1 | 21.6 |
| 130 | | | | | | 15.1 | 16.1 | 17.0 | 17.9 | 18.7 | 19.5 | 20.3 | 21.1 | 21.9 | 22.7 | 23.4 |
| 140 | | | | | | | | 17.5 | 18.5 | 19.5 | 20.4 | 21.4 | 22.3 | 23.3 | 24.2 | 25.1 |
| 150 | | | | | | | | | | | 21.2 | 22.4 | 23.5 | 24.6 | 25.7 | 26.8 |

MASS FLOW (LB/HR)
EVAPORATING TEMPERATURE, deg F

| CONDENSING TEMPERATURE deg F | -20 | -15 | -10 | -5 | 0 | 5 | 10 | 15 | 20 | 25 | 30 | 35 | 40 | 45 | 50 | 55 |
|---|---|---|---|---|---|---|---|---|---|---|---|---|---|---|---|---|
| 80 | 162.6 | 199.6 | 239.7 | 283.0 | 329.9 | 380.4 | 434.7 | 493.0 | 555.5 | 622.4 | 693.9 | 770.1 | 851.2 | 937.4 | | |
| 90 | 153.9 | 189.5 | 228.3 | 270.4 | 316.1 | 365.5 | 418.8 | 476.2 | 537.9 | 604.0 | 674.7 | 750.2 | 830.7 | 916.4 | | |
| 100 | 142.2 | 176.5 | 214.0 | 255.0 | 299.4 | 347.9 | 400.3 | 456.8 | 517.6 | 582.9 | 653.0 | 727.9 | 807.9 | 893.1 | 983.7 | 1080.0 |
| 110 | | 161.3 | 197.6 | 237.5 | 281.0 | 328.4 | 379.8 | 435.4 | 495.5 | 560.1 | 629.5 | 703.9 | 783.4 | 868.2 | 958.4 | 1054.4 |
| 120 | | | | 218.7 | 261.2 | 307.6 | 358.2 | 413.0 | 472.4 | 536.3 | 605.2 | 679.0 | 758.1 | 842.5 | 932.5 | 1028.2 |
| 130 | | | | | | 286.6 | 336.3 | 390.4 | 449.1 | 512.4 | 580.7 | 654.1 | 732.6 | 816.9 | 906.6 | 1002.2 |
| 140 | | | | | | | | 368.4 | 426.4 | 489.2 | 557.0 | 630.0 | 708.3 | 792.1 | 881.7 | 977.1 |
| 150 | | | | | | | | | | | 534.9 | 607.5 | 685.5 | 769.1 | 858.5 | 953.8 |

FIG. 10

BLOWER PERFORMANCE DATA

| MODEL AH20 | | | | | | | | |
|---|---|---|---|---|---|---|---|---|
| Blower Speed | S.C.F.M. at E.S.P. | | | | | | | |
| | .1 | .2 | .3 | .4 | .5 | .6 | .7 | .8 |
| High | 2125 | 2100 | 2055 | 2020 | 1980 | 1930 | 1870 | 1820 |
| Med. High | 1730 | 1710 | 1695 | 1675 | 1655 | 1620 | 1600 | 1585 |
| Low | 1385 | 1375 | 1365 | 1360 | 1345 | 1280 | 1300 | 1280 |

Note: C.F.M. deliveries shown are with filter and coil in place.

FIG. 12

| COOLING PERFORMANCE DATA |||||||||||||||||
|---|---|---|---|---|---|---|---|---|---|---|---|---|---|---|---|---|
| HEAT PUMP MODEL NUMBER: | BRHS060B |||||||||||||||
| INDOOR COIL MODEL NUMBER: | U25R60RV |||||||||||||||
| | AIR TEMPERATURE ENTERING OUTDOOR UNIT ||||||||||||||||
| INDOOR AIR || 75° ||| 85° ||| 95° ||| 105° ||| 115° |||
| | | CAPACITY MBTUH ||| CAPACITY MBTUH ||| CAPACITY MBTUH ||| CAPACITY MBTUH ||| CAPACITY MBTUH |||
| CFM | DB/WB | T.C. | S.C. | KW | T.C. | S.C. | KW | T.C. | S.C. | KW | T.C. | S.C. | KW | T.C. | S.C. | KW |
| 1500 | 85/71 | 63.7 | 39.0 | 4.51 | 60.4 | 37.5 | 4.85 | 57.1 | 36.6 | 5.19 | 53.7 | 35.4 | 5.50 | 50.2 | 34.1 | 5.80 |
| | 80/67 | 58.1 | 37.4 | 4.34 | 55.3 | 36.3 | 4.68 | 52.4 | 35.1 | 4.98 | 49.2 | 33.8 | 5.27 | 46.0 | 32.5 | 5.55 |
| | 75/63 | 53.2 | 36.1 | 4.22 | 50.4 | 34.9 | 4.52 | 47.8 | 33.8 | 4.81 | 44.7 | 32.3 | 5.08 | 41.7 | 31.0 | 5.30 |
| | 73/61 | 51.1 | 35.9 | 4.15 | 48.5 | 34.9 | 4.44 | 45.9 | 33.8 | 4.72 | 43.0 | 32.4 | 4.98 | 40.1 | 30.9 | 5.20 |
| 1700 | 85/71 | 64.9 | 41.3 | 4.55 | 61.5 | 40.1 | 4.89 | 58.1 | 38.8 | 5.23 | 54.8 | 37.6 | 5.54 | 51.9 | 36.4 | 5.85 |
| | 80/67 | 59.3 | 38.8 | 4.39 | 56.3 | 38.6 | 4.72 | 53.3 | 37.4 | 5.04 | 50.1 | 36.0 | 5.32 | 46.8 | 34.6 | 5.60 |
| | 75/63 | 54.4 | 38.1 | 4.25 | 51.7 | 36.9 | 4.55 | 48.9 | 35.7 | 4.85 | 45.8 | 34.3 | 5.10 | 42.6 | 32.8 | 5.35 |
| | 73/61 | 52.2 | 38.0 | 4.20 | 49.5 | 36.8 | 4.49 | 46.8 | 35.6 | 4.77 | 43.9 | 34.3 | 5.01 | 40.9 | 32.9 | 5.25 |
| 1300 | 85/71 | 65.9 | 43.4 | 4.58 | 62.4 | 42.2 | 4.93 | 58.9 | 40.9 | 5.27 | 55.4 | 39.7 | 5.59 | 51.9 | 38.4 | 5.91 |
| | 80/67 | 60.4 | 41.8 | 4.43 | 57.3 | 40.5 | 4.76 | 54.1 | 39.2 | 5.08 | 50.9 | 37.9 | 5.38 | 47.8 | 36.5 | 5.64 |
| | 75/63 | 55.5 | 39.9 | 4.29 | 52.6 | 38.7 | 4.59 | 49.8 | 37.4 | 4.89 | 46.4 | 36.0 | 5.14 | 43.1 | 34.8 | 5.39 |
| | 73/61 | 53.3 | 39.9 | 4.22 | 50.6 | 38.7 | 4.52 | 47.8 | 37.4 | 4.81 | 44.8 | 35.9 | 5.08 | 41.4 | 34.4 | 5.30 |

NOTE: All capacities are net with indoor fan already deducted at 1250 BTUH / 1000 CFM. KW rating for outdoor unit only.

FIG. 13

WIRELESS COMMUNICATION DEVICE FOR FIELD PERSONNEL

CROSS-REFERENCE TO RELATED APPLICATIONS

This invention claims the benefit of provisional patent application, Ser. No. 60/223,646, filed Aug. 8, 2000, the disclosure of which is hereby incorporated by reference herein.

BACKGROUND OF THE INVENTION

1. Field of the Invention

This invention relates to the utilization of a wireless hand held communication device that is capable of direct data entry by a field person such as a technician or engineer, of field-acquired data which is then transmitted by the wireless device to a base computer system whereupon the field-acquired data can be operated on by a software program running on the base computer and the computed data resulting thereof transmitted to the hand held communication device for display to field person or for on-site utilization or printing.

2. Description of the Background Art

During the course of performing repairs or maintenance to equipment, field technicians typically travel to the equipment site in order to obtain data concerning the equipment. Then, upon returning to their offices, such field-acquired data is used to analyze the equipment and determine an appropriate course of action for the repair or maintenance of such equipment. The field technician must then travel again to the equipment site in order to implement the appropriate repair or maintenance of the equipment.

There currently exists a need for a system that enables a field technician to obtain data in the field and transmit it to a base computer that is programmed to utilize the field-acquired data and compute a repair or maintenance analysis and an appropriate regime or methodology for implementing such repair or maintenance.

An object of the present invention is to provide a handheld wireless communication device for providing the ability to input field or remote location acquired data and information and transmitting said data and information to a base located computer system or service provider.

Another object of the present invention is to provide for the utilization of various software programs that said data and information is input into at the base located computer system or service provider.

Another object of the present invention is to provide for the utilization of the wireless communication device by the field person to receive requested, developed information based on the data input by said field person.

Another object of the present invention is to provide a wireless communication device and computer software system that allows for acquiring customer information in order to compile and maintain records of system performance and efficiency, and service and repair history.

Another object of the present invention is to provide a wireless communication device and computer software system for providing field personnel the ability to input data and information that would result in information concerning the actual field tested efficiency and performance being transmitted back via the wireless communication device to said field personnel after processing of the input data.

Another object of the present invention is to provide a wireless communication device and computer software system that can be utilized to select a specific desired function, such as troubleshooting assistance whereby personnel in a field location or situation may utilize the system to request trouble shooting assistance and following the guidelines provided by the system interact by inputting data and receiving data back and forth until the best solution is found, or the most probable problem is identified.

Another object of the present invention is to provide a wireless communication device and computer software system for providing field personnel the ability to compare the existing systems actual current cost of operation to various new, more efficient systems, first by providing for data input by the field personnel for determining which new system(s) would be used for comparison purposes and then by calculating data and information based on the field personnel selections and data input as well as utilizing the cost data available in the base located computer database which is then transmitted back to the field personnel or e-mailed directly to a potential client or customer.

Another object of the present invention is to provide a wireless communication and computer software system for providing field personnel the ability to input data relating to equipment or systems brand name, make, model number and serial number in order to access a database for parts of components needed to effect repair of said equipment or systems, and to determine the prices for those parts or components needed. Said parts information and prices then transmitted back to the field personnel via the wireless communication device. Further, the system could be set up to place the order for the parts directly with a supplier or parts distributor.

Another object of the present invention is to provide a wireless communication device and computer software system for providing field personnel the ability to order parts, through the base located computer or service provider, or to directly transmit the order to the proper parts distributor.

Another object of the present invention is to provide a wireless communication device and computer software system whereby field personnel can access a database for new equipment, and prices for the new equipment requested. This information based on new equipment availability, specifications and pricing.

Another object of the present invention is to provide a wireless communication device and computer software system for providing field personnel the ability to order new equipment through the base located computer or service provider, or to directly transmit the order to the proper new equipment distributor.

Another object of the present invention is to provide a wireless communication device and computer software system for providing field personnel the ability to input data and information that would be utilized to generate invoices for equipment or system(s) repair or replacement. A portable printer utilized with the field located wireless communication device could print invoices directly from data transmitted form the base located system or service provider. At the same time, this information could be transferred to the customer's file within the database and also added to the equipment repair and service profile summary. The system could also be set up to "e-mail" the invoice directly to the customer.

Another object of the present invention is to provide a wireless communication device and computer software system whereby field personnel could input data and access databases in order to generate quotations for new equipment or repairs. A portable printer utilized with the field located wireless communication device could print quotations directly from the data transmitted from the base located computer or service provider, or could be "e-mailed" to the customer's computer via the Internet. At the same time, this quotation and associated data would be transferred to the customer's file within the database and also added to the pending sales file.

Another object of the present invention is to provide a wireless communication device and method utilizing existing hardware devices coupled to specific usage and comprising both the hardware and software in direct communication with each other.

Another object of the present invention is to provide a wireless communication device and method utilizing existing hardware and software coupled to specific usage and comprising both hardware and software in communication with a central service provider or base located computer.

Another object of the present invention is to provide a wireless communication device and method comprising either a base source computer system for direct communication or a service provider's computer system, both utilizing the specifically programmed software.

Another object of the present invention is to provide a wireless communication device and method which incorporates specific software containing forms for data input and information fields utilized in the specific usage of the hardware and software.

Another object of the present invention is to provide a wireless communication device and method that incorporates databases sourced by the specifically programmed software programs, contained in either a base source computer system or from a service provider's computer system.

Another object of the present invention is to provide for the utilization of a wireless communication device and method comprising the application to specific industries and trades such as the HVACR industry and trade, the pluming industry and trade, the electrical industry and trade, the electronics industry and trade, the appliance industry and trade and any other industry or trade that is service oriented.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this present invention is defined by the appended claims with the specific embodiment shown in the attached drawings. The present invention comprises a first component that includes a wireless, hand-held communication device that allows for field acquired data and information to be input directly from the field location to a base or provider service located computer system. That first component is also used to acquire forms, data, calculations, analysis assistance, system pricing, ordering information and/or other developed information based on the initial field acquired input data.

Existing and developed programming is incorporated into an interactive program that allows the field located technician, engineer or service user to select the exact program desired for the developed data required. Input data forms for the particular developed data desired would be provided for the field acquired data, so that the field acquired data could be input correctly into the system.

The base or service provider located computer and software programming would utilize the input data to provide developed data in the form required, back to the field located technician, engineer or service user by means of the field located component. Concurrently, the field acquired data and developed data would be developed and stored within the base or service provider computer system for the purpose of developing a customer database, providing billing, providing equipment history, providing equipment analysis improvement, ordering equipment or parts and/or any other database storage, analysis or use.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 4a–4h are data sheets showing the possible data input available to the end user that would be displayed on the end user's portable computer;

FIGS. 5a–5b are data sheets showing in Part A the exemplary information entered by the technician and the prompting (shown highlighted) in Part B and other data sheets (e.g. III-Operational Data Sheet) as may be appropriate (based upon the information entered in Part A) that is then to be completed by the technician.

Figure 6A:
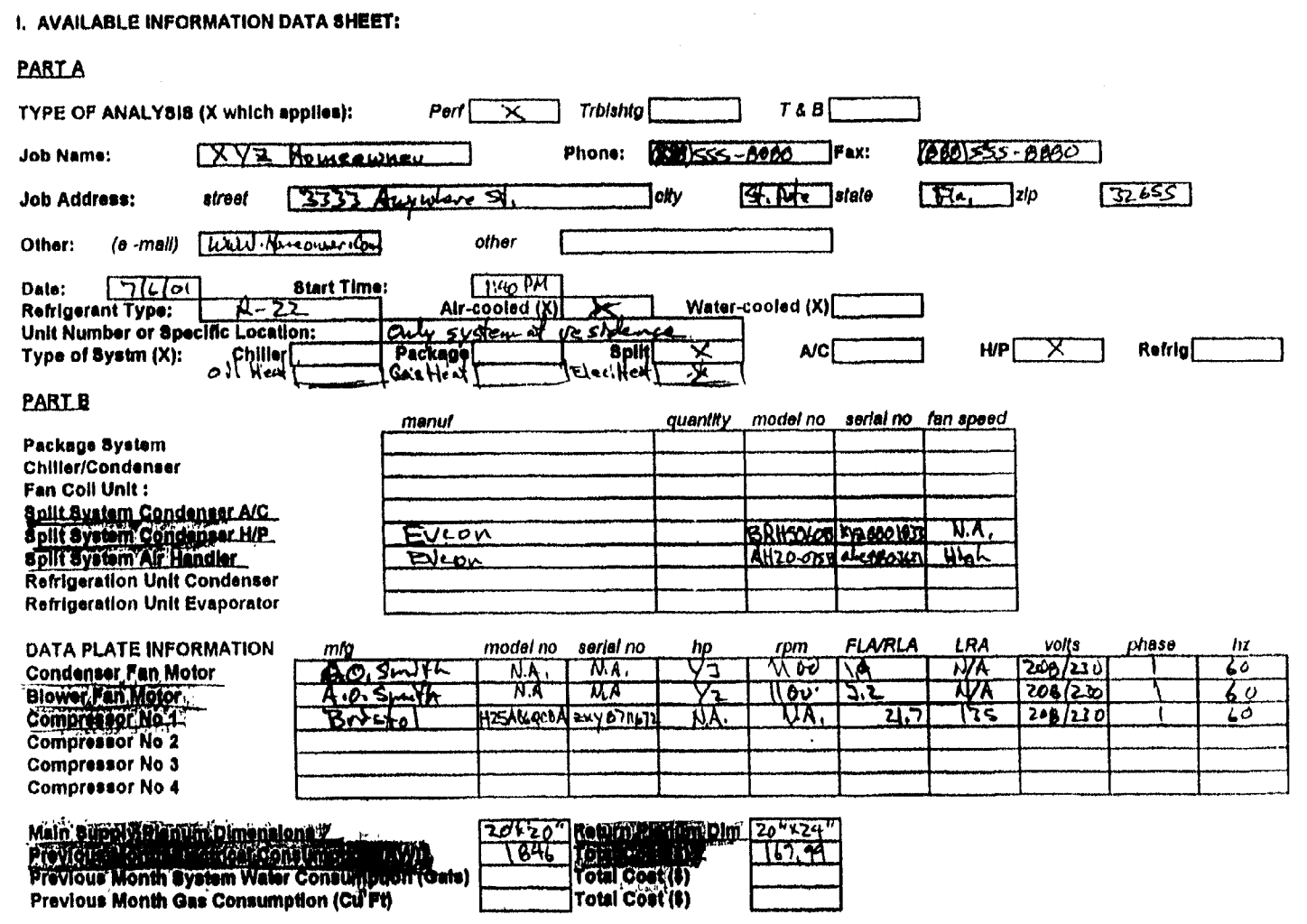

FIGS. 6a–6b are the data sheets as completed by the technician in response to the prompting of FIGS. 5a–5b.

FIG. 8 is an exemplary table showing the thermophysical properties of refrigerants, namely refrigerant 22 employed in the example of the present invention;

FIG. 9 is a superheated vapor-constant pressure table at various pressure intervals for the refrigerant (R-22) employed in the example of the present invention;

FIG. 10 is a performance table for of an exemplary compressor showing the capacity, power, current and mass flow thereof at various suction pressures and condensing temperatures that is used in the example according to the invention;

FIG. 12 is a blower performance data chart of an exemplary blower employed in the example of the present invention;

FIG. 13 is a cooling performance data chart of the exemplary condenser and air handler combination employed in the example of the present invention.

Similar reference characters refer to similar parts throughout the several views of the drawings.

DETAILED DESCRIPTION OF THE PREFERRED EMBODIMENT

Figure 1:
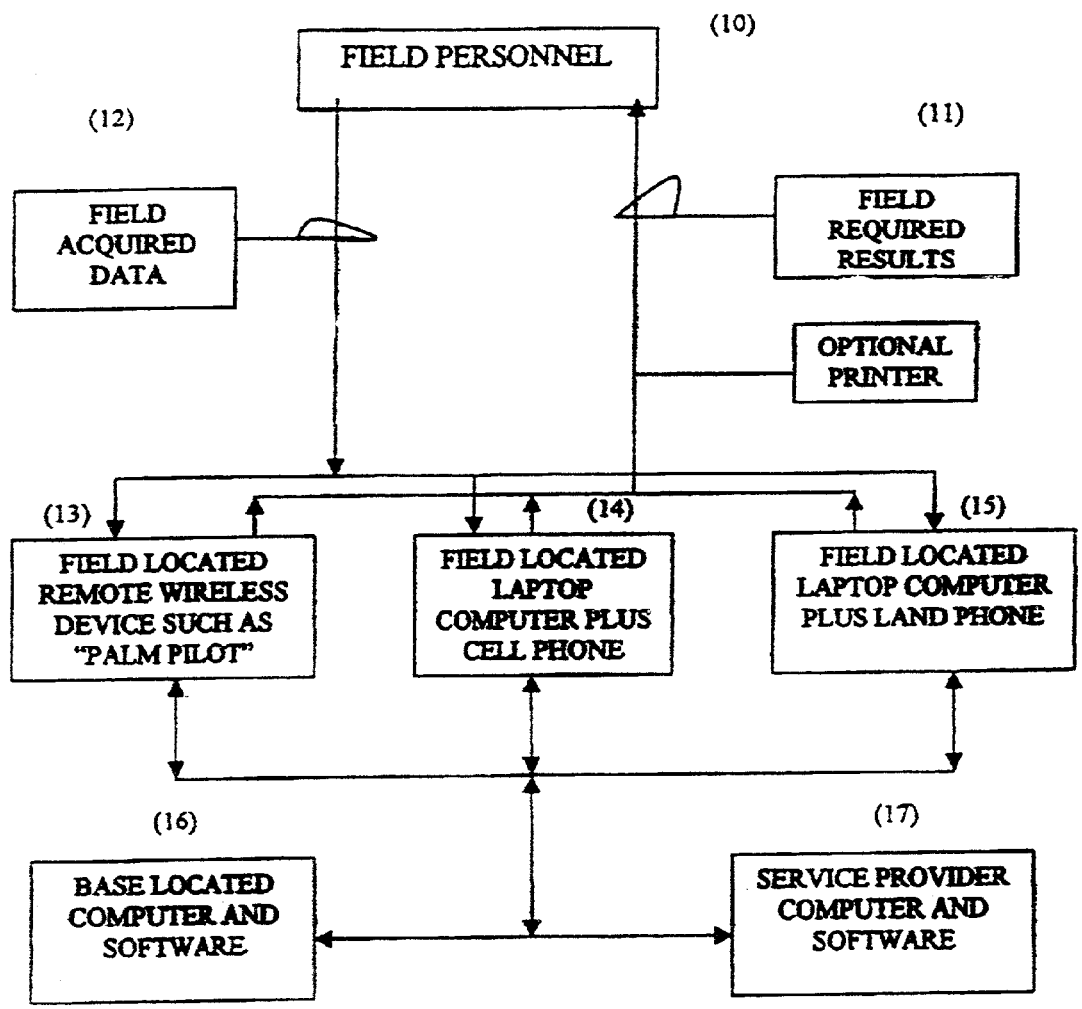
FIG. 1 is a flow schematic illustrating the flow of data and developed data between the field located personnel and base located or service provider located computer hardware and software.

With reference to the drawings and in particular to FIG. 1, a new and improved data input and retrieval system for field located technicians, engineers or others, device noted by the reference numeral 10 for providing sales presentation assistance, technical troubleshooting assistance, determining system efficiency and performance, increasing productivity, creating customer files and database, providing detailed information to customers, providing direct customer billing, as well as providing any other conceivable function based on field acquired data and information, designated by the reference numeral 11 by inputting field acquired data designated by the reference numeral 12, is input through a wireless hand-held device, designated by the reference numeral 13 or alternately through a combination of portable computer and cell phone, designated by the reference numeral 14 or alternately through a portable computer and through access to a non-cellular type direct connection phone, designated by the reference numeral 15, which, any of these, then connect to a base located primary computer and software system, designed by the reference numeral 16, or alternately to a service provider computer and software system, designated by the reference numeral 17, will be described.

First, for the field located technician, engineer or other 10, as illustrated in FIG. 1, field acquired data 12 is input in the field by means of a field located remote wireless device 13 or alternately by means of a portable computer and cell phone 14 or alternately by means of a portable computer and field located standard phone system 15 into a base located computer and software system 16 or alternately into a service provider computer and software system 17 for processing, so that the desired, developed, field requires results 11 can then be transmitted from said base located 16 or service provider 17 computer and software system back through the field located remote wireless device 13 or portable computer and cell phone 14, or portable computer and land phone 15 back to the field personnel 10 for utilization in the field and at the same time creating customer database information, billing data and other records in the base 11 or service provider 17 located computer and software system.

Figure 2:
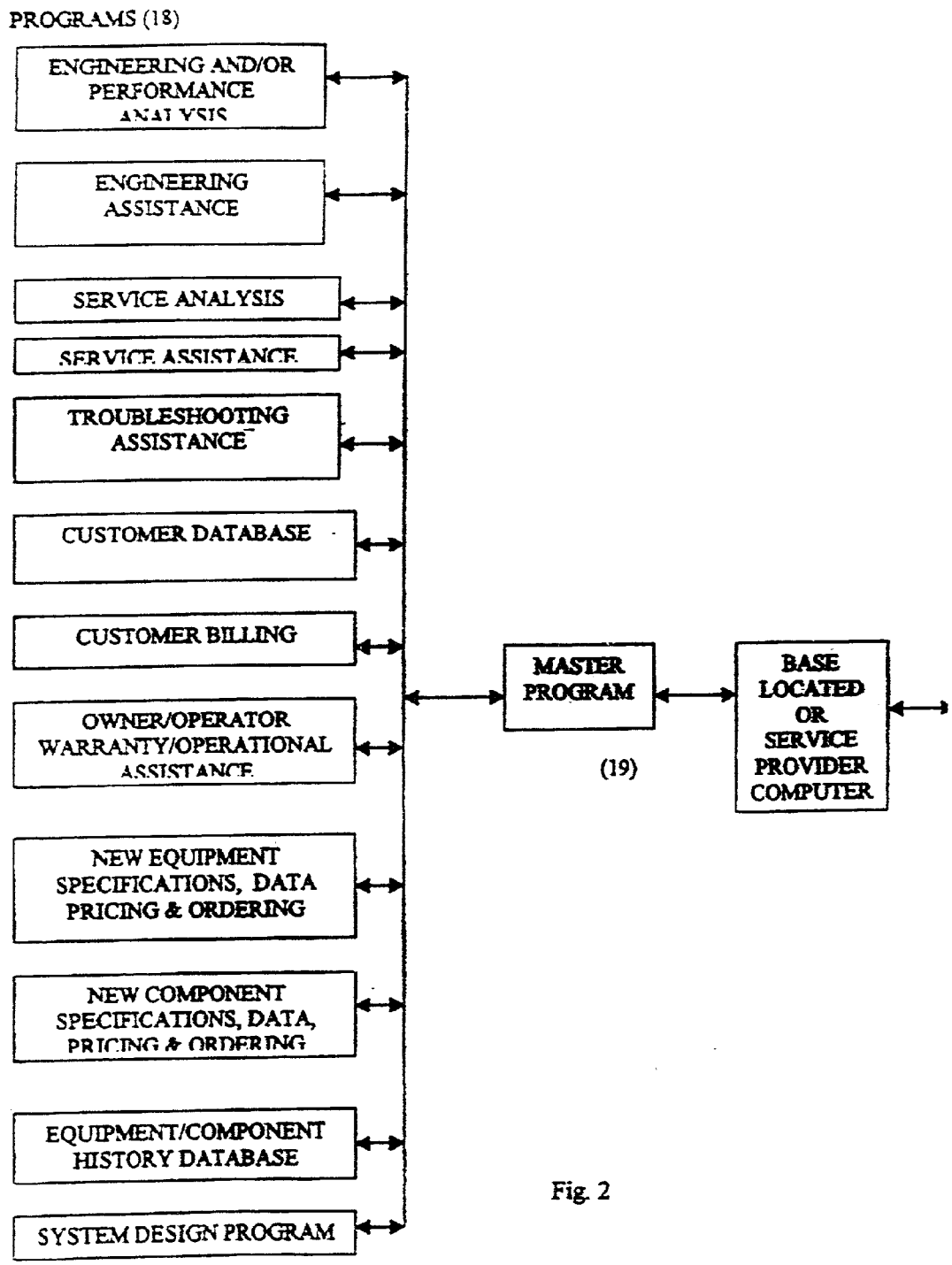
FIG. 2 is a flow schematic illustrating some of the possible software programs that would be utilized by the system and their potential for interaction.
Figure 3:
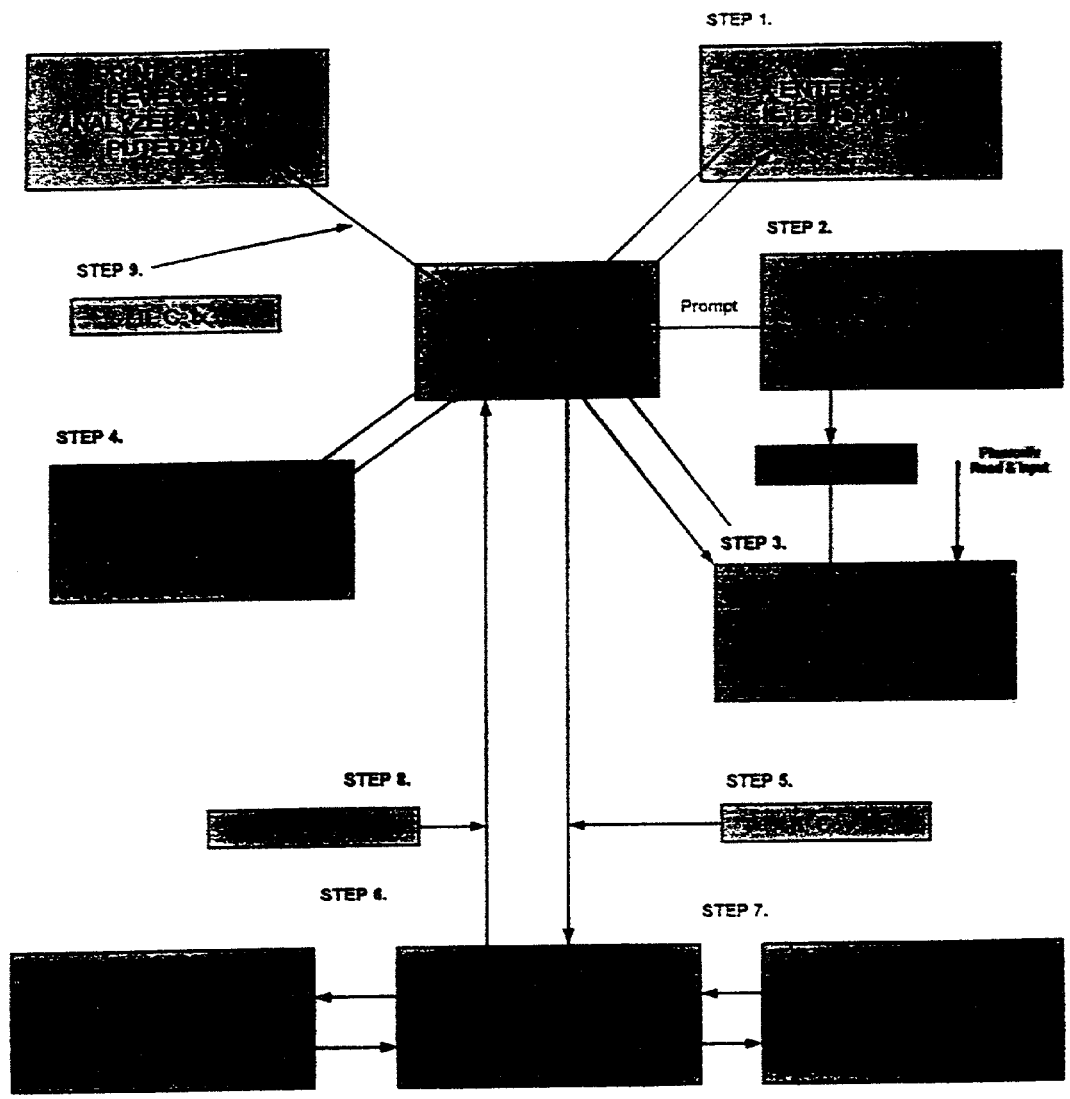
FIG. 3 is a block diagram showing the exemplary implementation of the present invention as applied to the HVAC technician/engineer.
Figure 4E:
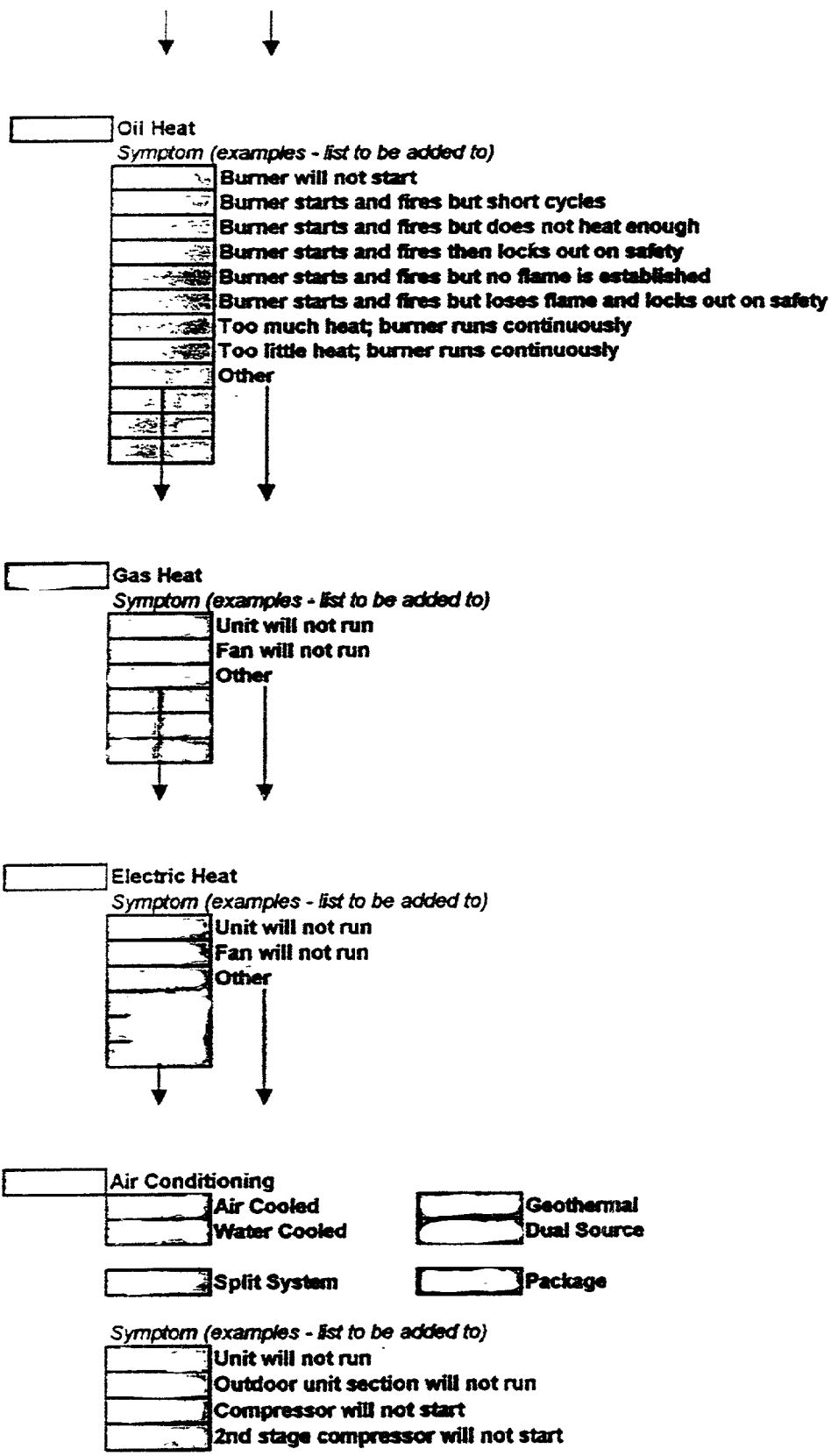
Figure 4F:
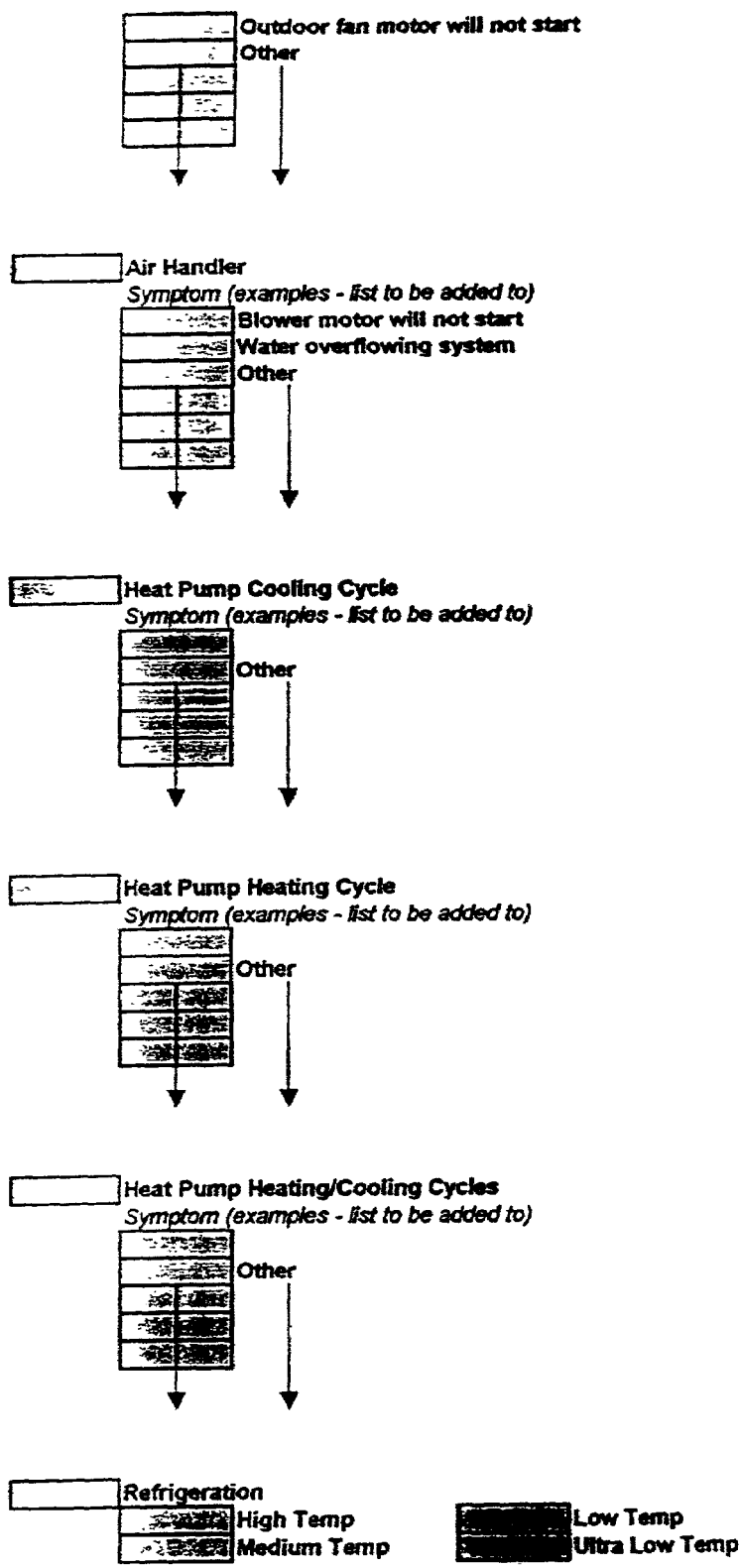

FIG. 2 is illustrative of some of the possible programs described by the reference number 18 and their inter relationship, through a master program described by the reference number 19 as utilized by the base located or service provider master computer 16, 17.

The field supplied data and information 12 is transmitted through the field located system 13, 14 or 15 to the base 16 or service provider 17 master computer to be processed by the master program 19 interrelating to the various programs 18, to, in turn, supply field required information 11 back through the field located system 13, 14, or 15, to the field located personnel 10 requiring said results.

The utilization of a field located combined limited computer component and field located wireless (or land based) communication device is a significant feature of this system that is best appreciated by the following implementation thereof as follows:

EXAMPLE—HVAC IMPLEMENTATION

The exemplary computer system support for field located HVAC technician/engineer is summarized as follows I. Purpose: To provide methodology whereby field located technician/engineer can utilize computer system to analyze field acquired date, utilizing all available equipment, data, thermodynamic date, electrical data, etc to provide analysis of field located equipment.

II. Example:
  A. An HVAC or refrigeration system is to be analyzed for performance, and/or operational problem and/or test and balance
  B. Need to know:
    i. Current system efficiency
    ii. Estimated annual cost of operation
    iii. All problems that system has
    iv. Potential savings with:
      a) All current problems solved and addressing those not solvable
      b) Changing to new equipment
      c) Adding 1 or more efficiency enhancing products to old equipment
      d) Changing to new equipment with 1 or more efficiency enhancing products
    v. Air flow balance
  C. Methodology
    i. On hand held computer on appropriate "form" enter all available of:
      a) Customer name
      b) Customer address and location
      c) Customer phone number
      d) Type of system
      e) System (or condenser) model number
      f) System (or condenser) serial number
      g) Air handler model number
      h) Air handler serial number
      i) Condenser fan hp, rpm, rated FLA, rated volts, hz
      j) Blower fan speed setting, hp, rpm, rated FLA, rated volts, hz
      k) Compressor model number
      l) Compressor serial number
      m) Compressor RLA, volts, hz
      n) Type of refrigerant
      o) Dimensions of main supply or return plenum where velocity pressure is to be measured
      p) Previous month electrical energy bill with total cost and total kw consumed
      q) Water cooled equipment cost and consumption
      r) Gas or oil equipment cost and consumption
    ii. Connect probes as below:
      a) Temperature (refrigerant)
        1) Hot gas discharge from compressor
        2) Hot gas entering condenser
        3) Mid condenser coil
        4) Liquid out of condenser 5) Liquid into expansion device
6) Mid evaporator coil
7) Suction line after evaporator
8) Suction line into compressor
9) If heat pump suction line into reversing valve
10) If heat pump hot gas line into reversing valve
b) Temperature (air)
1) Dry bulb temperature of air entering condenser
2) Wet bulb temperature of air entering condenser
3) Dry bulb temperature of air exiting condenser
4) Dry bulb temperature of air entering evaporator
5) Wet bulb temperature of air entering evaporator
6) Dry bulb temperature of air exiting air handler (after fan) if before blower motor—note in II C i,j)
c) Pressure (refrigerant)
1) Hot gas discharge pressure exiting compressor
2) Hot gas discharge pressure entering condenser
3) Liquid refrigerant pressure exiting condenser
4) Liquid refrigerant pressure entering expansion device
5) Suction pressure exiting the evaporator
6) Suction pressure entering compressor
d) Pressure (air flow)
1) Static pressure before air handler
2) Static pressure after air handler
3) Velocity pressure in straight section of main supply or return plenum
iii. Connect all probes to processor for data acquisition to field located computer section
iv. Enter on appropriate "form" on hand held computer all directly observable problems
a) Condition of condenser coil
b) Condition of evaporator coil
c) Condition of ductwork
d) Condition of dryers
e) Condition of suction accumulator
f) Condition of liquid receiver
g) Condition of reversing valve (h/p)
h) Condition of refrigerant lines (noticeable kinks, lack of insulation, deterioration, etc)
i) Condition of condenser fan motor
j) Condition of evaporator blower
k) Condition of belts
l) Location of any obvious oil spots indicating refrigerant leaks NOTE: For specific applications such as water cooled equipment, chillers, refrigeration equipment, etc, additional and/or different data points, observations and equipment date will need to be entered on "forms" specific to application.

v. Transmit all above date, acquired and entered into field unit, to "home" computer at base location for analysis
vi. "Home" computer has data banks with
a) All manufacturer's equipment performance data including
1) Capacity and power performance
2) Blower performance data
3) All specifications
b) All compressor manufacturer's performance data including
1) Compressor performance
2) Compressor performance algorithms
c) All motor manufacturer's specifications including allowable operating conditions
d) Complete list of problems versus symptoms for all types of refrigeration type equipment, including components such as compressors, motors, blowers, controls, etc
e) Complete list of all available efficiency increasing options and the effect of each on existing equipment
f) Complete list of all available new equipment efficiencies and effect of efficiency increasing options on the new equipment
g) Complete climatologically historical weather data for all world locations
h) Complete data base of all electrical energy rates throughout world
i) Complete date base of all cooling and/or heating load hours by location and by application
j) Ground conditions and temperatures by location
vii. "Home" computer uses all field-acquired data to search and integrate with available data banks as listed in vi. Above and using calculation algorithms available in calculation program to calculate or determine:
a) Current system efficiency
b) Estimated current annual cost of operation
c) All current equipment problems (possible)
d) Potential savings (plus cost and payback) for
1) All current problems solved (that can be solved by each solution and by combined solutions)
2) Change out old equipment to new equipment by efficiency available
3) Adding 1 or more efficiency enhancing products to old equipment by each product and by combined products
4) Combination of 2) and 3) above
viii. Transmit all developed, analyzed, and computed data from "home" computer back to field computer piece
ix. Print out all developed, analyzed and computed data from field computer piece input into field located printer or by hand onto field form More specifically, FIGS. 3–13 illustrate this HVAC implementation of the present invention wherein the steps employed are summarized as follows:

1. Fill in all available data in I. Part A (FIGS. 4a, 5a) on field located computer section.
2. Information provided in I. Part A (FIGS. 4a, 5a) prompts computer to display (or highlight) all additional data required in I. Part B (FIGS. 4a, 5a) and when II comes up (FIG. 4b), all data required and/or when Ill (FIGS. 4c, 5b) comes up, all data required and/or when IV (FIGS. 4d, 4e, 4f, 4g) comes up, all data required and/or when V (FIG. 4h) comes up all data required. In this case since performance was all that was selected and system is air-cooled, split system, heat pump, with auxiliary electric heat, only those items highlighted on I. Part B (FIG. 5a) and Ill. Operational Data Sheet (FIG. 5b) are required.
3. Fill in all required Data for I. Part B (FIG. 6a). Computer prompts if data is missing.
4. Attach probes, meters, gauges, etc. as required by highlighted/indicated data points shown on Ill. Operational Data Sheet (FIG. 6b).
5. Input all required data from probes through processor into field computer section and/or by hand after reading gauges, meters, etc. Computer prompts for any missing data (FIG. 6b, FIG. 3).
6. All data is them transmitted to Base (or Home or Web) (FIG. 3) computer for analysis.

7. Base computer accesses available data banks (FIG. 2.18) according to data provided and results desired.

Figure 7:
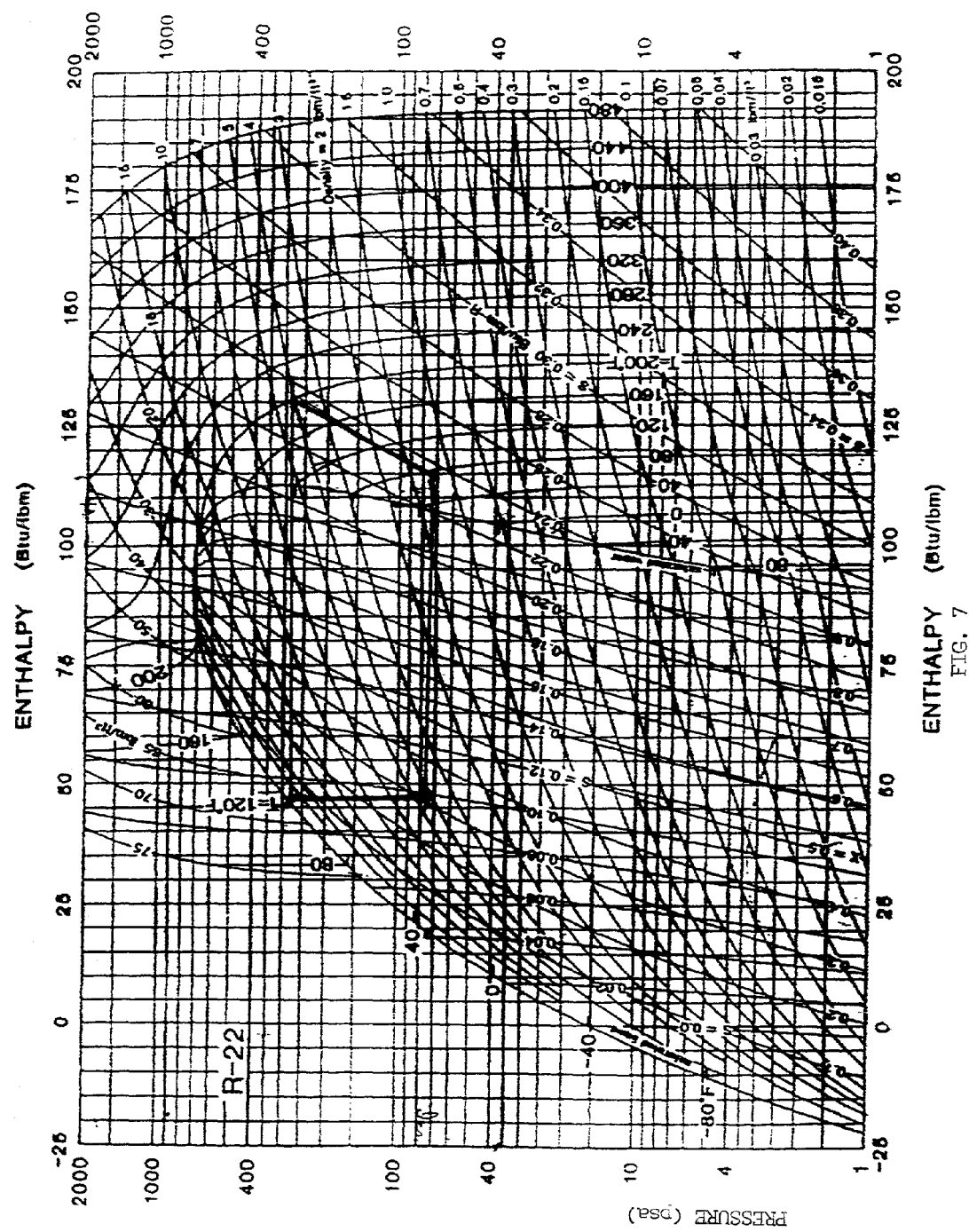
FIG. 7 is an exemplary R-22 pressure-enthalpy diagram showing the thermodynamic cycle of the example that implements the subject invention.
Figure 11:
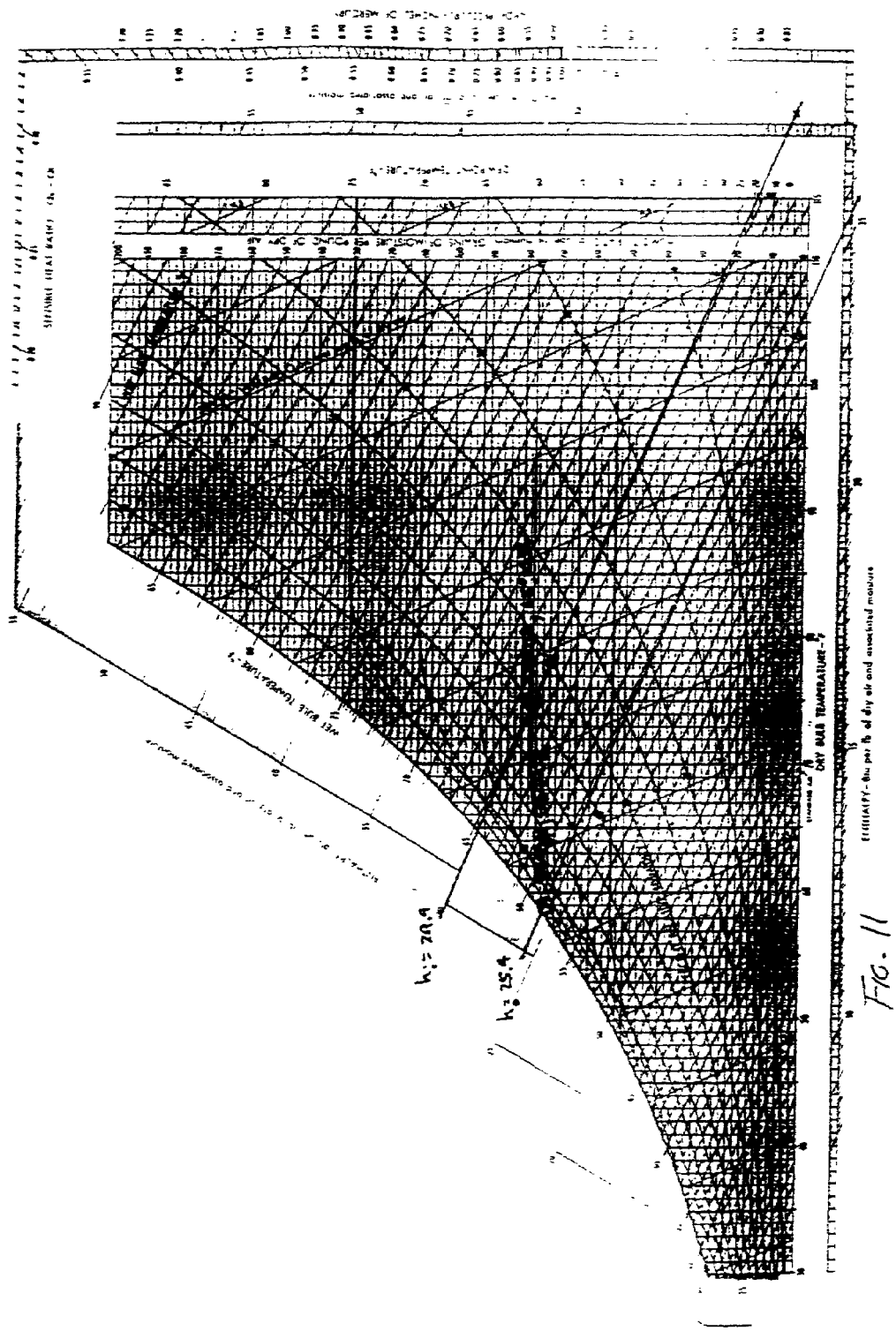
FIG. 11 is a psychrometric chart employed by the example of the present invention.

Examples:

a) Input of R-22 (FIGS. 5a, 6a) as refrigerant prompts access of R-22 pressure enthalpy data, diagrams, etc. (FIGS. 7, 8, 9). Plot of refrigeration cycle on pressure enthalpy diagram gives basic information throughout actual cycle (FIG. 7).

b) Split system condenser manufacturers name, model and serial numbers, (FIGS. 5a, 6a) prompts access of manufacturers cooling performance tables (FIG. 13).

c) Split system air handler manufacturer's name, model and serial numbers prompts access of manufacturer's blower performance table (FIG. 12).

d) Compressor manufacturers name, model and serial numbers prompts access to manufacturer's specific model number compressor performance table (FIG. 10).

e) Air handler airflow and temperature data prompts access to psychrometric data and chart(s) (FIG. 11).

8. Computer calculates all data points to provide data required for refrigeration cycle plot on R-22 pressure/enthalpy diagram (FIG. 7), providing for:

a) Determination of condenser phase change temperature. Results of plotting hot gas discharge temperature, liquid temperature, and suction line temperature provides condenser phase change temperature of approximately 124 Deg. F. (FIGS. 7, 8).

b) Determination of evaporator phase change temperature and super heat. Result of plotting R-22 suction pressure equivalent temperature and suction line temperature at compressor provides evaporator phase change temperature of approximately 31.8 Deg. F. and difference of 75−31.8=43.2 Deg. F superheat (from 7.a) above) (FIGS. 7, 8, 9).

c) Determine enthalpy of refrigerant from temperature of liquid refrigerant entering the expansion device at 124 Deg. F. Enthalpy approximately 42 (from 7.a) above) (FIG. 8).

d) Determine enthalpy of refrigerant exiting evaporator at 75 Deg. F. (43.2 Deg. F. superheat). Enthalpy approximately 114 (from 7.a) above) (FIG. 9).

e) Determine the change in enthalpy (Btu/lb.m. circulated) across evaporator 8.d)−8.c)=114−42=72

9. Computer using data from applicable compressor performance table (7.d) above) (FIG. 10) and condensing phase change temperature as well as evaporator phase change temperature as determined by 8.a) and 8.b) (FIGS. 7, 8, 9) above, the mass flow is determined to be approximately 611 lbs per hour.

10. Computer uses data provided for amps and volts for blower motor (FIG. 6b) and appropriate power factor to calculate:

a) Fan power. [(Li+L$_2$)/21×volts×power factor=((3.5+3.6)/21×232×0.95=782.4 watts b) and Fan heat penalty:=results of 10.a)×3.413 which is 782.4×3.413=2670 Btuh.

11. Net capacity from compressor performance data (FIG. 10) is calculated next using results of 8.e) and 9. and 10.b)

Net capacity=8.e)×9−10.b)

=72×611−2670=

=43992−2670=41322 Btuh

12. Next, if all data required is available, computer calculates the air side enthalpy net capacity as follows:

a) Air in enthalpy, is determined from psychrometric chart/data (FIG. 11) using air entering dry bulb (75.Deg. F.) and wet bulb (65.0 Deg. F.) temperatures. Enthalpy=29.9.

b) Air out, enthalpy, is determined from psychrometric chart/data (FIG. 11) using air exiting air handler dry bulb (59.Deg. F.) and wet bulb (58.4 Deg. F.) temperatures. Enthalpy=25.4.

c) Change in enthalpy equals results of 12.a)−results of 12.b)=29.9−25.4=4.5 d) Using the blower performance table (FIG. 12), (7.b) above) speed setting (high) (FIG. 5a) and difference in static pressure across (FIG. 6a) air handler=0.25−(−0.15)=0.4 the estimated air volume is determined. Air volume (at 0.4" static)=2020 CFM at high speed.

e) Using velocity pressure (0.022) and corresponding duct size (20"×20") (FIG. 6a) the air volume is again alternatively determined using the formula CFM=Area×Velocity. Area=(20"×20")/144=2.78 square feet. Velocity=4005×(0.033)^(½)=727.5 fpm. CFM=727.5×2.78=2023 CFM.

f) Net total capacity=4.5×results of 12.c)×average of results of 12.d) and 12.e). Net total capacity=4.5×4.5×(2020+2023)/2=40935 Btuh.

13. Total power is calculated by computer using amp meter readings and voltmeter readings for each component (FIG. 6b).

Total power=[(22.2+22.0)/2]×232×power factor of compressor (0.99 from 7.d) above) (FIG. 10)+[(1.6+1.7)/2]×232×power factor of outdoor fan (0.95 from 7.b) above)+[(3.5+3.6)/2]×232×power factor of blower motor and transformer (0.95 from 7.c) above)=6222 watts (input).

14. Efficiency is calculated by computer dividing results of 11. and 12.f (average) or either one alone if other not available by results of 13. above for operational EER at existing conditions EER (not ARI)=[(41322+40935)/2]/6222=6.6.

15. To calculate at ARI conditions, only compressor performance method can be used to calculate adjustments.

a) Adjust evaporator temperature used on compressor performance table by adding (or subtracting) difference between actual wet bulb temperature of air entering evaporator (65 Deg. F.) (FIG. 6b) and 67 Deg. F. (ARI point)

67 Deg. F.−65Deg. F.=2 Deg. F.

Adjusted evaporator temperature=31.8 Deg. F. results of 8.b) plus 2 Deg. F. (results above)

33.8 Deg. F.

b) Adjust condenser temperature used on compressor performance table by adding (or subtracting) difference between dry bulb temperature of ARI design point 95 Deg. F. and dry bulb temperature actually entering the condenser (92 Deg. F.) (FIG. 6b).

95 Deg. F.−92 Deg. F.=3 Deg. F.

1) Adjusted condenser temperature=124 Deg. F. (results of 8.a)+3 Deg.F.=127 Deg. F.

2) Adjusted liquid temperature=124 Deg. F.+3 Deg. F.=127 Deg. F.

c) With these adjusted temperatures, determine capacity using mass flow determined from compressor performance table (CPT) (FIG. 10) and the change in enthalpy from refrigerant conditions and pressure enthalpy diagram/data (FIGS. 7, 8, 9).

1) Mass flow extrapolated from CPT (FIG. 10) at 33.8 Deg. F. evaporator and 127 Deg. F. condenser is approximately
[(33.8−30)/(35−30)]×(679.0−605.2)+605.2=661.3
[(33.8−30)/(35−30)]×(651.1−580.7)+580.7=636.5
[(130−127)/(130−125)]×(661.3−636.5)+636.5=651.2 lbs/hr.

2) Change in enthalpy. Liquid enthalpy at 127 Deg. F. (FIG. 8) approximately 46.3. Gas enthalpy at 33.8 Deg. F.+43.2 Deg. SH (FIG. 9) approximately 107.6+8 or 115.6
Change in enthalpy=115.6−48.3=67.3

3) Capacity=67.3×651.2 (43826) less fan heat (results of 10.b)=2670 Btuh)=41156 Btuh d) Also with these temperatures determine the difference between the rated power at ARI adjusted conditions and actual conditions.
1) At ARI adjusted for 33.8 Deg. F. evaporator and 127 Deg. F. condenser—from Compressor performance table compressor power (FIG. 10)
@ 120 Deg. F. [(33.8−30)/(35−30)]×(4356−4210)+ 4210=4321 watts
@ 130 Deg. F. [(33.8−30)/(35−30)]×(4614−4433)+ 4433=4571 watts
@ 127 Deg. F. [(127−120)/(130−120)]×(4571−4321)+ 4321=4496 walls 2) At actual conditions for 31.8 Deg. F. evaporator and 124 Deg. F. condenser
@ 120 Deg. F. [(31.8−30)/(35−30)]×(4356−4210)+ 4210=4263 watts
@ 130 Deg. F. [(31.8−30)/(35−30)]×(4614−4433)+ 4433=4498 watts
@ 124 Deg. F. [(124−120)/(130−120)]×(4498−4263)+ 4263=4357 watts 3) Difference in rated power=4496−4357=139 additional watts.

e) EER at ARI conditions adjusted from actual run conditions=results of compressor performance capacity at actual conditions (11.) minus results of CPT capacity at adjusted ARI conditions (12.c.3)) plus average of air side enthalpy (12.f) and CPT capacities (11) divided by total power determined at actual running conditions (13.) plus (or minus) the correction for compressor power at ARI conditions (15.d) 3))
={[(41 322+40935)/2]+(41156−41322)}/(6222+139)
=(41129−166)/6361
=40963/6361
=6.44 EER at ARI conditions Analysis Results Methodology The methodology of the analysis results is as follows:

I. (a) Actual current ARI Standard capacity (at 95 Degrees F. outdoor ambient conditions; 80 Degree F. Dry Bulb, 67 Degree F. Wet Bulb conditions) is the average of the actual capacity conditions found from compressor performance data (FIG. 10) (result shown on 11 above) and the actual condition capacity found from airside enthalpy (FIG. 11) calculations which result is found on 12.f.) above, plus the correction factor for capacity extrapolated to ARI Standard conditions determined from the compressor performance table (FIG. 10) (result shown on 15.c) 3) above)=(41322 BTUH+40935 BTUH)/2+(negative 166 BTUH)=41129−166=40963 BTUH.

(b) Power at ARI Standard conditions are the sum of the total power determined from actual amperage readings and voltage readings (FIG. 6*b*) calculated in 13. above plus the correction factor for the compressor (from the compressor performance table (FIG. 10) to ARI Standard conditions as shown in 16 above and results shown in 16.3 above=6222 watts+139 watts=6361 watts input.

(c) E.E.R. (@ ARI Standard conditions) equals result of I. a) above divided by I. b) above=40963 BTUH output divided by 6361 watts input=6.44.

II. (a) The equipment manufacturers name and equipment model number (FIGS. 5*a*, 6*a*) causes the computer to access the manufacturers specifications and performance data published for this particular piece of equipment. From the performance data (FIG. 13) listed at a 95 Degree F. outdoor ambient condition and an 80 degree F. Dry Bulb, 67 degree Wet Bulb indoor ambient condition, the net capacity is given as 54,100 BTUH and the condenser power is given as 5080 watts and the indoor blower power allowance is 365 watts per 1,000 CFM, the blower power is 365×1.9=694 watts for a total power input of 5774 watts. The rated E.E.R. at ARI conditions therefore equals 54,100 BTUH output divided by 5774 watts input equals 9.37.

(b) The percentage of rated capacity is the capacity derived for I. a) above (40963 BTUH) divided by the capacity derived for II. a) above (54,100 BTUH)× 100=40963 divided by 54,100×100=75.7%. The percentage of reduced efficiency is the difference in E.E.R.'s as determined in II. a.) minus I. c.) divided by the rated E.E.R. (II. a.))×100=(9.37−6.44)9.37× 100=31.3% reduced efficiency.

(c) The system analysis of problems associated with the performance of the system comes from the comparison of actual refrigerant conditions to standard refrigerant and operating conditions at similar outdoor and indoor conditions for the type of system and refrigerant.

1) High superheat is determined from comparison of actual superheat of 43.2 Degrees F. as determined in 8.b) from field determined data (FIGS. 6*a*, 6*b*) to the normal 12 to 15 Degrees F. superheat expected in a properly operating R-22 refrigerant air conditioning system. The normal maximum superheat being 20 Degrees F.

2) Lack of sub-cooling is determined by comparing actual liquid temperature entering the expansion device (124 Degrees F. from Sheet III—Operational Data Sheet) (FIG. 6*b*) to condensing temperatures associated with the liquid refrigerant pressure (result @ 8.a), 124 Degrees F. derived from R-22 properties (FIG. 8) at 275 PSIG as entered on Sheet III) (FIG. 6*b*), No sub-cooling shown at all.

3) High superheat coupled with little or no sub-cooling would indicate either a) low refrigerant charge, b) restriction in condenser or between condenser and expansion device or c) non-condensables. The lack of temperature change from that expected from the hot gas discharge temperature measurement at the outlet of the compressor (200 Degrees F. coupled with the intersection of the liquid refrigerant pressure and the constant entropy line from the superheated suction gas to the hot gas intersection (FIG. 7) indicates no pressure loss through the condenser and the constant liquid temperature between the outlet of the condenser and the inlet of the TXV (FIG. 7) also indicates no pressure loss. Therefore the only two possible causes would be II.c) 3) a.) or II. c) 3) c) as described above.

(d) The high condensing temperature (124 Degree F.) coupled with high superheat (43.2 Degree F.) indicates the possibilities of non-condensables and/or a problem with air flow through the condenser which could be result of a; a) dirty condenser or b) bad fan motor (power requirement of fan is within norms as compared to fan specifications; therefore this is probably not the problem, although an incorrect pitch on the fan blade could be possible). Comparison of actual compressor (FIG. 10) power consumption to rated power consumption on the CPT (FIG. 10) also indicates a possible problem with the run capacitor.

(e) Comparison of actual measured compressor power consumption to rated power consumption on the CPT (FIG. 10) also indicates a possible problem with the run capacitor.

III. (a) Estimated cost to repair is based on the data for National average cost of repair for the possible conditions listed above. The primary reference is "Means Mechanical Cost Data" as updated yearly and said cost adjusted for locality as outlined in I. Part A of Available Information Data Sheet (FIGS. 5a, 6a) and adjusted per data available in Means Mechanical Cost Data.

(b) Calculations for savings is based on increasing efficiency to Manufacturers rated efficiency (FIG. 13) and savings is based on ARI cooling hours for locality (2400) and the local electrical energy cost (FIG. 6a). The cost to produce a total of 54,100 BTUH for 2400 hours at a current E.E.R. of 6.44 would require an actual run time of 54,100 BTUH×2400 hours divided by 40963=3170 hours.

Current Cost=40963 BTUH Capacity divided by 6.44 E.E.R. (watts/BTUH) divided by 1000 watts(kwh)× 3170 hours×$167.99 (total previous month's electrical energy cost) divided by 1846 watts (total previous months electrical energy usage) (FIG. 6a)=6361 divided by 1000×3170×$0.091/kwh=$1,835.00 per year.

At rated efficiency and capacity (with repairs):

Repaired Equipment Cost=54,100 BTUH Capacity divided by 9.37 E.E.R. (watts/BTUH) divided by 1000 watts(kwh)×2400 hours×$167.99 (total previous month's electrical energy cost) (FIG. 6a) divided by 1846 watts (total previous months electrical energy usage)=6361 divided by 1000×2400×$0.091/kwh=$1,260.00 per year.

Savings=Current cost per year minus repaired equipment cost per year=$1835.00−$1260.00=$574.00 per year resulting in a % savings=$574 divided by $1835=31.3%.

Simple Payback equals cost divided by savings−$150. to $500 divided by $574.00×12 months/year=(0.261 to 0.871×12)=3.1 to 10.5 months.

IV. (a) Replacement costs are based on data available from "Means Mechanical Cost Data" and/or other cost data information available. Could be adjusted by contractor, technician or engineers input.

(b) Cost of operation and savings are based on providing 54,100 BTUH for 2400 hours compared to current cost associated with providing 40,903 BTUH for 3170 hours at an E.E.R. of 6.44.

@ 10 S.E.E.R. (9.3 E.E.R.) Cost=$1270/year Savings=$565/year

@ 12 S.E.E.R. (11.0 E.E.R.) Cost=$1074/year Savings=$761/year

@ 14 S.E.E.R. (12.0 E.E.R.) Cost=$985/year Savings=$850/year

@ 15 E.E.R (15.0 E.E.R.) Cost=$788/year Savings=$1047/year

Cost to operate=54,100 BTUH divided by the E.E.R.× 2400 hours divided by 1000watt/kwh×$0.091/kwh.

Savings=Current cost to operate minus new equipment cost to operate.

Payback=Estimated installed cost divided by estimated savings.

Analysis Results

I. Current EER=6.44 at capacity of 40963 Btuh at ARI standard conditions.

II. From the cooling performance data, at 95° F. the net cooling capacity at ARI conditions should be 54100 Btuh and the EER should be 9.37.

The system is running at (40963/54100)×100=75.7% of rated capacity and at [(9.37−6.44)/9.37]×100=31.3% reduced efficiency.

The high superheat and lack of sub cooling indicated an undercharged condition with no indication of any restrictions.

The relatively high condensing temperature at this undercharged condition indicated a very dirty condenser or some type of air blockage. Fan motor (condenser) is within parameters; therefore the problem is either a coil obstruction or a defective fan blade. The abnormally high single phase (FIG. 5a, 6a) compressor power indicates a possible bad run capacitor.

III. The estimated cost to repair all problems could range from $150.00 to $500.00 with a net decrease in cost of operation of 30 to 35%. On an annual basis for this equipment in this location, this would amount to a savings of 0.30 to 0.35×(40963/6.44)×(54900/40963)×(2400 hr/100)×($167.99/1846 kw=0.30 to 0.35×$1835/yr=$550 to $640 per year.

The payback would be from less than 3 months to as many as 11 months.

IV. To replace this equipment with new equipment:

| | Estimated installed cost | Savings* | Payback |
| --- | --- | --- | --- |
| 10 SEER H/P | $3900 +/− | $550 to $640 per year | 6.1 to 7.1 years |
| 12 SEER H/P | $4300 +/− | ~$700 per year | ~5.7 years |
| 14 SEER H/P | $5100 +/− | ~$850 per year | ~6.0 years |
| ~15 EER D/S/H/P | $7400 +/− | ~$1050 per year | ~7.0 years |
| Geothermal H/P ~15 EER | ~$14000 +/− | ~$1050 per year | ~13.3 years |

*Does not include savings from heating efficiency increase (minimal heating load hours in this region).

V. With any of the above, a heat recovery unit is recommended which has an estimated installed cost of $700 to $1100 which would generate a hot water energy cost savings of approximately $300 to $400 per year with a payback of 1.75 to 3.67 years.

End of Sample Analysis

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An HVAC field located support computer, comprising:
   (a) a recorder for recording HVAC system data and equipment data;
   (b) a recorder for acquiring and recording HVAC system and equipment operational data from temporary field installed sensors;
   (c) a transmitter for transmitting raw HVAC data from the field location to a central computer system for processing;
   (d) a receiver for receiving processed and analyzed HVAC data at the field location from the central computer;
   (e) a display for displaying a series of prompts to prompt the entry of additional HVAC data as required by the central computer for completion of the HVAC diagnosis/analysis, said HVAC diagnosis/analysis comprising information needed by the HVAC technician to repair any needed functionality of the HVAC system and to increase efficiency of the HVAC system;
   (f) a display for displaying the results of the central computer's HVAC diagnosis/analysis; and
   (g) a printer for printing out the results of the central computer's HVAC diagnosis/analysis.

2. The HVAC field located support computer of claim 1 wherein at least part of said field support computer is a field located data input, storage and retrieval computer.

3. The HVAC field located support computer of claim 1 wherein at least part of said field support computer is a field located wireless communication device capable of transmitting and receiving computer generated data.

4. The HVAC field located support computer of claim 1 wherein at least part of said field support computer is a central computer system capable of interpreting and analyzing raw HVAC data and providing HVAC analysis and diagnosis based upon the raw HVAC data.

5. The HVAC field located support computer of claim 1 wherein at least part of said field support computer is a centrally located wireless communication device capable of transmitting and receiving computer generated HVAC data.

6. The HVAC field located support computer of claim 1 further comprising an external data store.

7. The HVAC field located support computer of claim 1 wherein said external data store contains HVAC operational data and specifications specific to the HVAC equipment being analyzed/diagnosed.

8. The HVAC field located support computer of claim 1, wherein said external data store contains parts cost and availability specific to the HVAC equipment being analyzed and diagnosed.

9. The HVAC field located support computer of claim 1 wherein the central computer establishes a customer data sheet for historical recording of analysis and diagnosis.

10. The HVAC field located support computer of claim 1 wherein the central computer establishes a customer data sheet for invoicing and billing purposes.

11. An HVAC field located support computer, comprising:
   (a) a recorder, operable by a field located technician or engineer for recording HVAC system data and equipment data;
   (b) a recorder for acquiring and recording system and equipment operational data from temporary field installed sensors;
   (c) a transmitter for transmitting raw HVAC data from the field location to a central computer system for processing;
   (d) a receiver for receiving processed and analyzed HVAC data at the field location from the central computer;
   (e) a display for displaying a series of prompts to enter additional HVAC data as required by the central computer for completion of the HVAC diagnosis/analysis, said HVAC diagnosis/analysis comprising information needed by the HVAC technician to repair any needed functionality of the HVAC system and to increase efficiency of the HVAC system;
   (f) a display for displaying the results of the central computer's HVAC diagnosis/analysis; and
   (g) a printer for printing out the results of the central computer's diagnosis/analysis.

12. The HVAC field located support computer of claim 11 wherein at least part of said field support computer is a field located data input, storage and retrieval computer.

13. The HVAC field located support computer of claim 11 wherein at least part of said field support computer is a field located phone line capable of transmitting and receiving computer generated data.

14. The HVAC field located support computer of claim 11 wherein at least part of said field support computer is a central computer system capable of interpreting and analyzing raw HVAC data and providing HVAC analysis and diagnosis based upon the raw HVAC data.

15. The HVAC field located support computer of claim 11 wherein at least part of said field support computer is a centrally located phone line communication device capable of transmitting and receiving computer generated data.

16. The HVAC field located support computer of claim 11 further comprising means for accessing an external data store.

17. The HVAC field located support computer of claim 11 wherein said external data store contains operational HVAC data and specifications specific to the equipment being analyzed/diagnosed.

18. The HVAC field located support computer of claim 1, wherein said external data store contains HVAC parts cost and availability specific to the equipment being analyzed and diagnosed.

19. The HVAC field located support computer of claim 1 wherein the central computer establishes a customer data sheet for historical recording of analysis and diagnosis.

20. The HVAC field located support computer of claim 1 wherein the central computer establishes a customer data sheet for invoicing and billing purposes.

* * * * *